(12) United States Patent
Olson et al.

(10) Patent No.: US 12,063,105 B2
(45) Date of Patent: Aug. 13, 2024

(54) BIDIRECTIONAL OPTICAL COMMUNICATIONS

(71) Applicant: Infinera Corporation, San Jose, CA (US)

(72) Inventors: Magnus Olson, Jaerfaella (SE); Amir Rashidinejad, Santa Clara, CA (US)

(73) Assignee: Infinera Corporation, San Jose, CA (US)

( * ) Notice: Subject to any disclaimer, the term of this patent is extended or adjusted under 35 U.S.C. 154(b) by 0 days.

(21) Appl. No.: 17/561,942

(22) Filed: Dec. 25, 2021

(65) Prior Publication Data

US 2022/0376812 A1    Nov. 24, 2022

Related U.S. Application Data

(62) Division of application No. 16/577,932, filed on Sep. 20, 2019.

(60) Provisional application No. 62/844,176, filed on May 7, 2019.

(51) Int. Cl.
| | |
|---|---|
| *H04B 10/61* | (2013.01) |
| *G02B 6/42* | (2006.01) |
| *H04B 10/25* | (2013.01) |
| *H04B 10/40* | (2013.01) |
| *H04J 14/02* | (2006.01) |
| *H04J 14/06* | (2006.01) |

(Continued)

(52) U.S. Cl.
CPC ........ *H04J 14/0298* (2013.01); *G02B 6/4246* (2013.01); *H04B 10/2589* (2020.05); *H04B 10/40* (2013.01); *H04B 10/616* (2013.01); *H04J 14/06* (2013.01); *H04L 5/0044* (2013.01); *H04L 27/2602* (2013.01)

(58) Field of Classification Search
CPC .................... H04B 10/40; H04B 10/616–6166
See application file for complete search history.

(56) References Cited

U.S. PATENT DOCUMENTS

| | | | |
|---|---|---|---|
| 2006/0093369 A1* | 5/2006 | Nagarajan ............... | H04J 14/02 398/135 |
| 2009/0136234 A1* | 5/2009 | Mottahedin ............ | H04B 10/40 398/135 |

(Continued)

*Primary Examiner* — Nathan M Cors
(74) *Attorney, Agent, or Firm* — David L. Soltz

(57) ABSTRACT

This disclosure describes digitally generating sub-carriers (SCs) to provide isolation and dynamic allocation of bandwidth between uplink and downlink traffic between transceivers that are communicatively coupled via a bidirectional link including one or more segments of optical fiber. Separate uplink and downlink communication channels may be created using digitally generated SCs and using the same transmitter laser. In some implementations, one or more of the nodes include a transceiver having at least one laser and one digital signal processing (DSP) operable for digitally generating at least two SCs and detecting at least two SCs. The transceiver can transmit selected SCs, and can receive other SCs. Accordingly, the transceiver can facilitate bidirectional communication, for example, over a single optical fiber link. In some instances, techniques can facilitate dynamic bandwidth assignment by facilitating adding or blocking of optical subcarriers from transmission in an uplink or downlink direction.

12 Claims, 27 Drawing Sheets

(51) Int. Cl.
   *H04L 5/00*   (2006.01)
   *H04L 27/26*   (2006.01)

(56) References Cited

U.S. PATENT DOCUMENTS

2010/0021163 A1\* 1/2010 Shieh .................. H04B 10/614
                                                  398/65
2016/0291135 A1\* 10/2016 Ando .................... G01S 7/4811
2020/0136722 A1\* 4/2020 Urban ................ H04B 10/0779
2021/0242943 A1\* 8/2021 Cao .................... H04B 10/2537

\* cited by examiner

BIDIRECTIONAL OPTICAL COMMUNICATIONS

CROSS-REFERENCE TO RELATED APPLICATION(S)

This application claims the benefit of priority of U.S. Provisional Patent Application No. 62/844,176, filed on May 7, 2019. The contents of that application are incorporated herein by reference.

TECHNICAL FIELD

This disclosure relates to bidirectional optical communications.

BACKGROUND

Optical fiber communication facilitates transmitting information from one location to another by sending, for example, light signals through an optical fiber. The light forms an electromagnetic carrier wave that can be modulated to carry information. Conventionally, optical fibers are provided for communication to the edge of an optical communication network.

Single fiber bidirectional optical transmission refers to the capability of transmitting optical signals in the same fiber but in opposite directions. Compared to a two fiber system, in which each of two separate fibers is used to perform single directional transmission, the number of optical fibers to be used can be reduced.

SUMMARY

This disclosure describes, among other things, systems and methods for digitally generating sub-carriers (SCs) to provide isolation and dynamic allocation of bandwidth between uplink and downlink traffic between transceivers that are communicatively coupled via a bidirectional link including one or more segments of optical fiber. In some implementations, separate uplink and downlink communication channels can be created using digitally generated SCs and using the same transmitter laser. In some implementations, one or more of the nodes include a transceiver having at least one laser and one digital signal processing (DSP) that can be implemented, for example, as an application-specific integrated circuit (ASIC). The DSP can be operable for digitally generating at least two SCs and detecting at least two SCs. The transceiver can transmit selected SCs (for example, using the at least one laser), and can receive other SCs. Accordingly, the transceiver can facilitate bidirectional communication, for example, over a single optical fiber link. In some instances, the described systems and methods also can facilitate dynamic bandwidth assignment (DBA) by adding or blocking optical subcarriers from transmission in an uplink or downlink direction.

In one aspect, the present disclosure describes a transceiver that includes an optical port configured to be coupled to an optical fiber. The transceiver further includes a transmitter and a receiver. The transmitter includes a laser operable to output an optical signal, a first DSP circuit, and a modulator.

The first digital signal processor circuit is operable to receive first data and to provide a first plurality of electrical signals based on the first data and a first control signal, and to provide a second plurality of electrical signals based on second data and a second control signal.

The modulator is operable to modulate the optical signal to provide a first plurality of optical subcarriers based on the first plurality of electrical signals and a second plurality of optical subcarriers based on the second plurality of electrical signals, where a number of the first plurality of subcarriers being different from a number of the second plurality of subcarriers, and the first or second pluralities of subcarriers are supplied to the optical fiber via the optical port.

The receiver includes a photodiode circuit and a second DSP circuit. The photodiode circuit includes at least one photodiode to receive first optical mixing products or second optical mixing products, the first optical mixing products being based on a third plurality of optical subcarriers received from the optical fiber via the optical port and a local oscillator signal, and the second optical mixing products being based on a fourth plurality of optical subcarriers received from the optical fiber via the optical port and the local oscillator signal. The photodiode circuit is operable to supply third electrical signals based on the first optical mixing products or fourth electrical signals based on the second optical mixing products. The second DSP circuit is operable to output third data based on the third electrical signals or fourth data based on the fourth electrical signals.

Some implementations include one or more of the following features. For example, the transceiver can be configured such that the third plurality of optical subcarriers is received form the optical fiber after the first control signal is supplied to the first digital signal processor circuit, and the fourth plurality of optical subcarriers is received from the optical fiber after the second control signal is supplied to the first digital signal processor circuit.

In some instances, a sum of a number of the first plurality of subcarriers and the third plurality of subcarriers is equal to a sum of the second plurality of subcarriers and the fourth plurality of subcarriers. In other instances, a sum of a number of the first plurality of subcarriers and the third plurality of subcarriers is different from a sum of the second plurality of subcarriers and the fourth plurality of subcarriers.

In some implementations, the transceiver includes an optical hybrid circuit operable to supply the first mixing products or the second mixing products. In some cases, the laser is a first laser, and the transceiver further includes a second laser operable to supply the local oscillator signal, wherein the second laser is a local oscillator laser. In some cases, the transceiver may be configured such that a portion of the optical signal is supplied to the photodiode circuit as the local oscillator signal. In some instances, each of the first plurality of subcarriers and each of the second plurality of subcarriers is a Nyquist subcarrier. Likewise, in some cases, each of the third plurality of optical subcarriers and each of the fourth plurality of optical subcarriers is a Nyquist subcarrier. A frequency of one of the first plurality of optical subcarriers may be the same as a frequency of the one of the fourth plurality of subcarriers.

In some implementations, the transceiver includes a circulator having a first port optically coupled to the transmitter, a second port optically coupled to the receiver, and a third port configured to be coupled to the optical fiber. In some cases, the transceiver is configured such that the first plurality of optical subcarriers or the second plurality of optical subcarriers is supplied to the first port of the circulator, and the third plurality of optical subcarriers or the fourth plurality of optical subcarriers is output from the second port of the circulator.

In some implementations, the transceiver includes a coupler having a first port optically coupled to the transmitter, a second port optically coupled to the receiver, and a third port configured to be coupled to the optical fiber. In some instances, the first plurality of optical subcarriers or the second plurality of optical subcarriers is supplied to the first port of the coupler, and the third plurality of optical subcarriers or the fourth plurality of optical subcarriers is output from the second port of the coupler.

In another aspect, the present disclosure describes a system that includes a first transceiver and a second transceiver. The first transceiver is operable to supply a first plurality of optical subcarriers to an optical fiber and to receive a second plurality of optical subcarriers from the optical fiber during a first time interval, and is operable to supply a third plurality of optical subcarriers to the optical fiber and receive a fourth plurality of subcarriers from the optical fiber during a second time interval, a number of the first plurality of subcarriers being different from a number of the third plurality of subcarriers, and a number of the second plurality of subcarriers being different from a number of the fourth plurality of subcarriers. The second transceiver is operable to supply at least one of the second plurality of subcarriers during the first time interval and at least one of the fourth plurality of subcarriers during the second time interval, and is operable to receive at least one of the first plurality of subcarriers during the first time interval and at least one of the third plurality of subcarriers during the second time interval.

Some implementations include one or more of the following features. For example, in some instances, a sum of a number of the first plurality of subcarriers and a number of the second plurality of subcarriers is equal to a sum of the third plurality of subcarriers and a number of the fourth plurality of subcarriers. In some cases, a frequency of one of the first plurality of optical subcarriers is the same as a frequency of the one of the fourth plurality of subcarriers. In some implementations, each subcarrier in each of the first plurality of subcarriers, each of the second plurality of subcarriers, and each of the third plurality of subcarriers can be a Nyquist subcarrier.

In a further aspect, the present disclosure describes a system that includes a first transceiver, a second transceiver and a third transceiver. The first transceiver is operable to supply a first plurality of optical subcarriers to an optical fiber and receive a second plurality of optical subcarriers from the optical fiber during a first time interval, and to supply a third plurality of optical subcarriers to the optical fiber and receive a fourth plurality of subcarriers from the optical fiber during a second time interval, a number of the first plurality of subcarriers being different from a number of the third plurality of subcarriers, and a number of the second plurality of subcarriers being different from a number of the fourth plurality of subcarriers. The second transceiver is operable to supply at least a first one of the second plurality of subcarriers during the first time interval and at least a first one of the fourth plurality of subcarriers during the second time interval, and is operable to receive at least a first one of the first plurality of subcarriers during the first time interval and at least a first one of the third plurality of subcarriers during the second time interval. The third transceiver is operable to supply at least a second one of the second plurality of subcarriers during the first time interval and at least a second one of the fourth plurality of subcarriers during the second time interval, the third transceiver operable to receive at least a second one of the first plurality of subcarriers during the first time interval and at least a second one of the third plurality of subcarriers during the second time interval.

Some implementations include one or more of the following features. For example, in some cases, a sum of a number of the first plurality of subcarriers and a number of the second plurality of subcarriers is equal to a sum of the third plurality of subcarriers and a number of the fourth plurality of subcarriers. In some instances, a frequency of one of the first plurality of optical subcarriers is the same as a frequency of the one of the fourth plurality of subcarriers. Each subcarrier in each of the first plurality of subcarriers, each of the second plurality of subcarriers, and each of the third plurality of subcarriers may be a Nyquist subcarrier.

In some implementations, the system inclueds an arrayed waveguide grating (AWG) having a first port and a plurality of second ports, wherein the first port is optically coupled to the first transceiver via the optical fiber, a first one of the plurality of second ports is optically coupled to the second transceiver, and a second one of the plurality of second ports is optically coupled to the third transceiver. In some cases, the system is configured such that the first port of the AWG receives the first plurality of optical subcarriers from the first transceiver during the first time interval and supplies the second plurality of optical subcarriers to the first transceiver during the second time interval. In some instances, the system is configured such that the first one of the plurality of second ports of the AWG supplies said at least the first one of the third plurality of subcarriers during the first time interval to the second transceiver, and the second one of the plurality of second ports supplies said at least the second one of the fourth plurality of subcarriers during the second time interval to the third transceiver.

In some implementations, the system includes a splitter having a first port and a plurality of second ports, wherein the first port is optically coupled to the first transceiver via the optical fiber, a first one of the plurality of second ports is optically coupled to the second transceiver, and a second one of the plurality of second ports is optically coupled to the third transceiver. In some cases, the system is configured such that the first port of the splitter receives the first plurality of optical subcarriers from the first transceiver during the first time interval and supplies the second plurality of optical subcarriers to the first transceiver during the second time interval. In some cases, he system is configured such that the first one of the plurality of second ports of the splitter supplies said at least the first one of the third plurality of subcarriers during the first time interval to the second transceiver, and the second one of the plurality of second ports supplies said at least the second one of the fourth plurality of subcarriers during the second time interval to the third transceiver.

In yet another aspect, the present disclosure describes an apparatus that includes a photodiode circuit, an analog-to-digital conversion circuit, and a digital signal processor. The photodiode circuit includes at least one photodiode configured to receive optical mixing products based on a local oscillator signal and a plurality of optical subcarriers transmitted on an optical fiber from a remote transmitter. The photodiode circuit further is configured to receive back-reflected light from the optical fiber, such that the photodiode circuit provides electrical signals based on the optical mixing products and the back-reflected light. The analog-to-digital conversion circuit is operable to provide digital outputs based on an analog inputs, the analog inputs being indicative of the electrical signals provided by the photodiode circuit. The digital signal processor is operable to receive the digital outputs and generate first internal signals indicative of data carried by the plurality of optical carriers and second internal signals indicative of the back-reflected light, the digital signal processor operable to cancel the second internal signals and provide output data based on the first internal signals.

Some implementations include one or more of the following features. For example, each of the plurality of subcarriers can have a corresponding one of a plurality of frequencies, each of the plurality of frequencies being different from a frequency associated with the back-reflected light. In some cases, the plurality of subcarriers is a first plurality of subcarriers, and the apparatus further includes an optical transmitter operable to supply a second plurality of subcarriers to the optical fiber.

In some implementations, the apparatus includes an optical hybrid circuit operable to receive the local oscillator signal and the plurality of optical subcarriers and outputs the mixing products. In some cases, the apparatus includes a local oscillator laser operable to supply the local oscillator signal. In some instances, the apparatus includes a plurality of multiplier circuits, wherein the apparatus is configured such that the second internal signals are cancelled out by multiplying the second internal signal by zero with the plurality of multiplier circuits.

In some implementations, the digital signal processor includes a fast Fourier transform circuit operable to provide frequency domain data based on the digital outputs of the analog-to-digital conversion circuits; a plurality of switches; and a plurality of memories. The plurality of switches can be operable to cancel the second internal signals by selectively supplying predetermined data to the plurality of memories instead of frequency domain data associated with the second internal signals.

In another aspect, the present disclosure describes a transceiver including a transmitter, a receiver and an optical port configured to be coupled to an optical fiber.

The transmitter includes a laser, a first digital signal processor circuit, and a modulator. The laser is operable to output an optical signal. The first digital signal processor circuit is operable to receive first data and to provide a first plurality of electrical signals based on the first data and a first control signal and a second plurality of electrical signals based on second data and a second control signal. The modulator is operable to modulate a first portion of the optical signal to provide a first plurality of optical subcarriers based on the first plurality of electrical signals and a second plurality of optical subcarriers based on the second plurality of electrical signals, a number of the first plurality of subcarriers being different from a number of the second plurality of subcarriers. The first or second pluralities of subcarriers are supplied to the optical fiber via the optical port.

The receiver includes a photodiode circuit and a second digital signal processor circuit. The photodiode circuit includes at least one photodiode configured to receive first optical mixing products or second optical mixing products, the first optical mixing products being based on a third plurality of optical subcarriers received from the optical fiber via the optical port and a second portion of the optical signal, and the second optical mixing products being based on a fourth plurality of optical subcarriers received from the optical fiber via the optical port and the second portion of the optical signal. The photodiode circuit is operable to supply third electrical signals based on the first optical mixing products or fourth electrical signals based on the second optical mixing products. The second digital signal processor circuit is operable to output third data based on the third electrical signals or fourth data based on the fourth electrical signals.

Some implementations include one or more of the following features. For example, in some cases, the transceiver is configured such that the third plurality of optical subcarriers is received form the optical fiber after the first control signal is supplied to the first digital signal processor circuit and the fourth plurality of optical subcarriers is received from the optical fiber after the second control signal is supplied to the first digital signal processor. In some cases, a sum of a number of the first plurality of subcarriers and the third plurality of subcarriers is equal to a sum of the second plurality of subcarriers and the fourth plurality of subcarriers. In some instances, a sum of a number of the first plurality of subcarriers and the third plurality of subcarriers is different from a sum of the second plurality of subcarriers and the fourth plurality of subcarriers.

In some implementations, the transceiver includes an optical hybrid circuit operable to supply the first mixing products or the second mixing products. In some cases, each of the first plurality of subcarriers and each of the second plurality of subcarriers is a Nyquist subcarrier. Likewise, in some cases, each of the third plurality of optical subcarriers and each of the fourth plurality of optical subcarriers is a Nyquist subcarrier. A frequency of one of the first plurality of optical subcarriers can be the same as a frequency of the one of the fourth plurality of subcarriers.

Some implementations of the transceiver include a circulator having a first port optically coupled to the transmitter, a second port optically coupled to the receiver, and a third port configured to be coupled to the optical fiber. The transceiver can be configured such that the first plurality of optical subcarriers or the second plurality of optical subcarriers is supplied to the first port of the circulator, and the third plurality of optical subcarriers or the fourth plurality of optical subcarriers is output from the second port of the circulator.

Some implementations of the transceiver include a coupler having a first port optically coupled to the transmitter, a second port optically coupled to the receiver, and a third port configured to be coupled to the optical fiber. In some insatnces, the transceiver is configured such that the first plurality of optical subcarriers or the second plurality of optical subcarriers is supplied to the first port of the coupler, and the third plurality of optical subcarriers or the fourth plurality of optical subcarriers is output from the second port of the coupler.

The present disclosure describes various methods. In some cases, a method may include performing certain actions during a first time interval and additional actions during a second time interval. For example, a method can include supplying, from a first transceiver, a first plurality of optical subcarriers to an optical fiber during a first time interval. The method includes receiving, in a second transceiver, a first one of the first plurality of subcarriers during the first time interval, and receiving, in a third transceiver, a second one of the first plurality of subcarriers during the first time interval.

The method further includes supplying, from the second transceiver, at least a first one of a second plurality of subcarriers to the optical fiber during the first time interval, and supplying, from the third transceiver, at least a second one of the second plurality of subcarriers to the optical fiber during the first time interval. The method also includes receiving, in the first transceiver, the second plurality of optical subcarriers from the optical fiber during the first time interval.

In accordance with the method, a third plurality of optical subcarriers are supplied to the optical fiber from the first transceiver during a second time interval. The method further includes receiving, in the second transceiver, a first one of the third plurality of subcarriers during the second time interval, and receiving, in the third transceiver, a second one of the third plurality of subcarriers during the second time interval. The method also includes supplying, from the second transceiver, at least a first one of a fourth plurality of subcarriers to the optical fiber during the second time interval, and supplying, from the third transceiver, at least a second one of the fourth plurality of subcarriers to the optical fiber during the second time interval. In addition, the method includes receiving, in the first transceiver, the fourth plurality of optical subcarriers from the optical fiber during the second time interval. In accordance with the foregoing method, a number of the first plurality of subcarriers is different from a number of the third plurality of subcarriers, and a number of the second plurality of subcarriers is different from a number of the fourth plurality of subcarriers. In some implementations, a sum of a number of the first plurality of subcarriers and a number of the second plurality of subcarriers is equal to a sum of the third plurality of subcarriers and a number of the fourth plurality of subcarriers.

Some implementations of the present disclosure can provide one or more of the following advantages. For example, in some instances, relative to traditional systems, increased spectral efficiency can be achieved because cross-talk between SCs in the digital domain can be reduced substantially (for example, by using digital filters). In some instances, a single-channel spectral efficiency of approximately 2.8 bps/Hz can be achieved. Uplink and downlink channels can be spectrally close to each other without a large guard-band. When compared with traditional approaches, system cost and complexity can be reduced because, for example, a laser may be used both as a local oscillator and as a transmitter.

Other aspects, features, and advantages will become apparent from the following detailed description, the drawings, and the claims.

DETAILED DESCRIPTION

Figure 1:
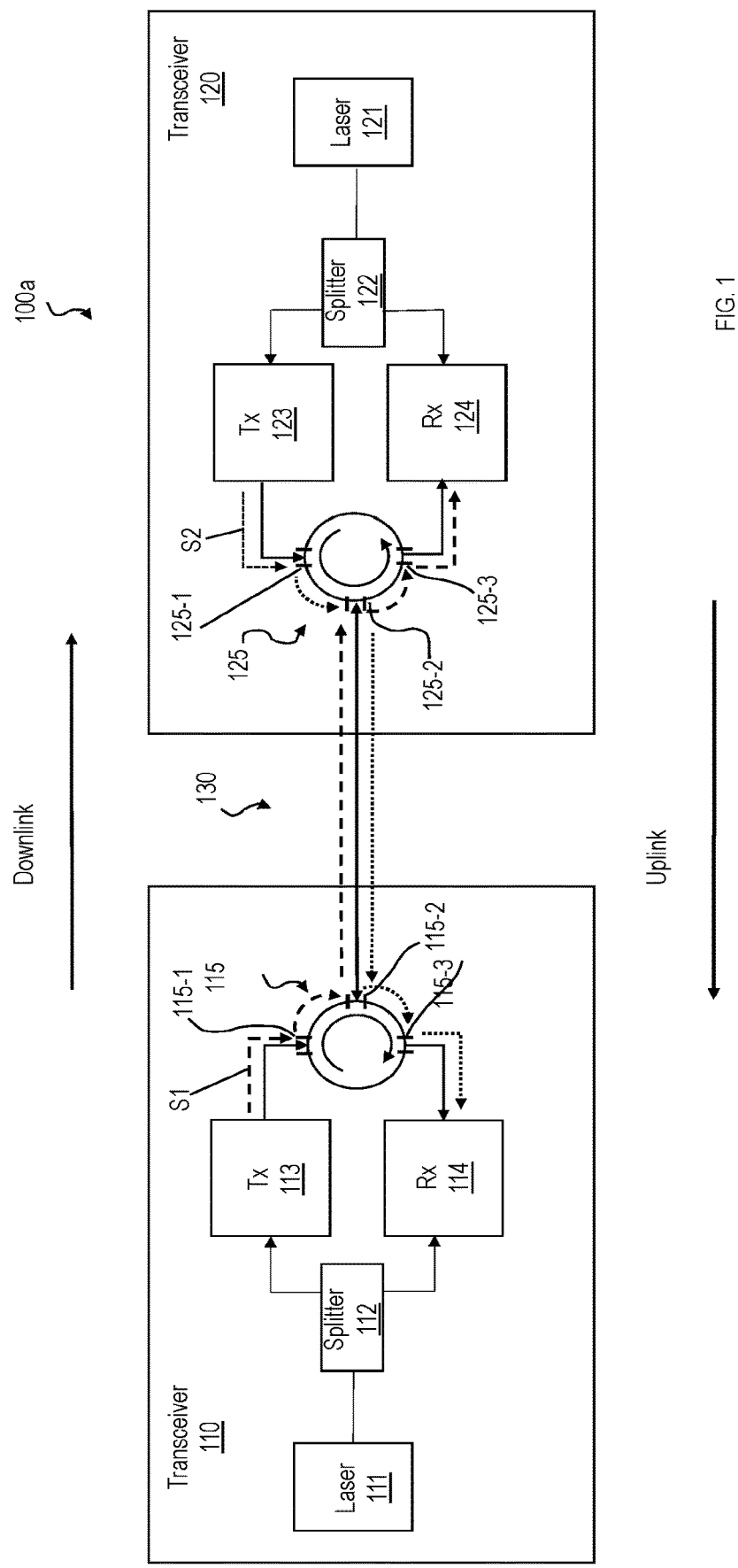
FIGS. 1-2 are diagrams illustrating examples of point-to-point bidirectional communication systems, in accordance with one or more implementations of the present disclosure.

Reference will now be made in detail to the present exemplary embodiments of the present disclosure, which are illustrated in the accompanying drawings. In general, the same reference numbers will be used throughout the drawings to refer to the same or like parts.

This disclosure describes systems and methods for digitally generating sub-carriers (SCs) to provide isolation and dynamic allocation of bandwidth between uplink and downlink traffic between transceivers that are communicatively coupled via a bidirectional link including one or more segments of optical fiber. In some instances, the optical subcarriers may be generated, for example, by a single laser that is modulated to provide multiple optical signals, each being associated with a data stream, and each being spectrally spaced from one another so that they do not overlap spectrally with one another (or are sufficiently non-overlapping such that the optical signals remain distinguishable from each other in the frequency domain). In some implementations, separate uplink and downlink communication channels can be created using digitally generated SCs and using the same transmitter laser. In some implementations, one or more of the nodes include a transceiver having at least one laser and one digital signal processing (DSP) that can be implemented, for example, as an application-specific integrated circuit (ASIC). The DSP is operable for digitally generating at least two SCs and detecting at least two SCs. The transceiver can transmit selected SCs (for example, using the at least one laser), and can receive other SCs. Accordingly, the transceiver can facilitate bidirectional communication, for example, over a single optical fiber link. In some instances, the described systems and methods also can facilitate dynamic bandwidth assignment (DBA) by facilitating adding or blocking of optical subcarriers from transmission in an uplink or downlink direction.

In some implementations, first portion of light output from a laser at an end of a link may be modulated to carry or transmit data and a second portion of light output from the laser may be used as a local oscillator signal. Lasers, so configured, are sometimes referred to as a "shared transmit/receive laser" or a "shared local oscillator (LO) laser". In some implementations, due to processing of digital signals associated with received optical subcarriers, the effects of spurious optical signals, such as those corresponding to so-called "back reflections" of transmitted optical subcarriers, may be cancelled out. Optical subcarriers, therefore, may be provided with a relatively narrow bandwidth and may be provided spectrally close to one another, without a large guard band, such that spectral efficiency of such optical subcarriers may be as high as that achieved in a single-direction coherent communications system. In some implementations, different uplink and downlink communication channels can be created using digital subcarriers and the same Tx/Rx laser (locked to each other by DSPs on both ends of the link).

Figure 2:
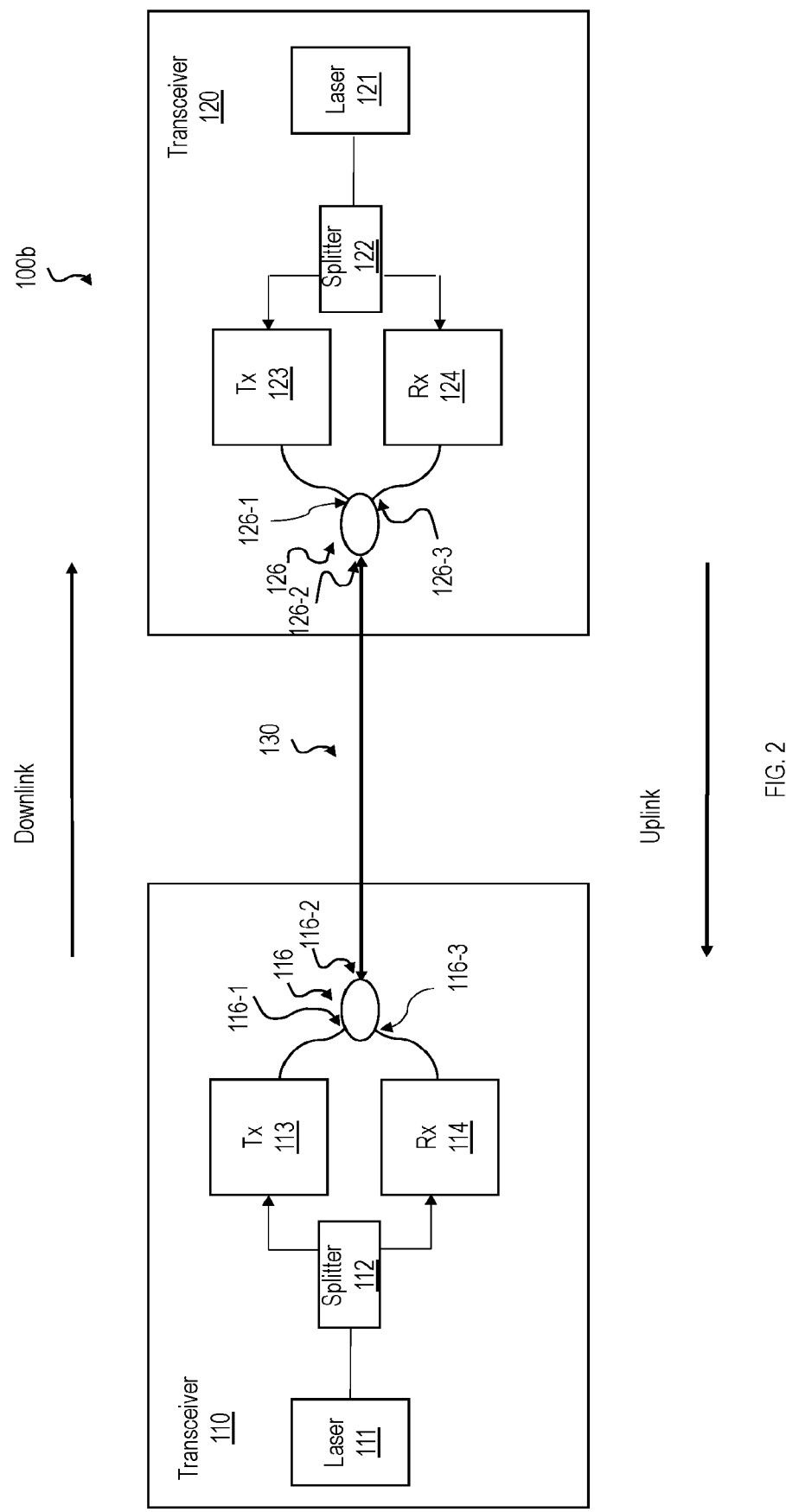

FIGS. 1-2 are diagrams illustrating, respectively, point-to-point bidirectional communication systems 100a, 100b, in accordance with one or more implementations of the present disclosure. As shown in FIG. 1, the system 100a includes a first transceiver 110 and a second transceiver 120 communicatively coupled via a bidirectional link 130 (for example, an optical fiber).

The first transceiver 110 includes a laser 111, a splitter 112, a transmitter 113, a receiver 114, and a circulator 115. The laser 111 is communicatively coupled (for example, via an optical fiber) and is configured to generate and provide an optical signal, such as a continuous wave (CW) optical signal. The splitter 112 is communicatively coupled to the transmitter 113 and the receiver 114. In the illustrated example, the splitter 122 is configured to receive the optical signal generated by laser 111 and split the signal into two portions. The splitter 112 is configured to provide the first portion of the signal to the transmitter 113 and the second portion to the receiver 114. The second portion of the signal can be used at the receiver 114, for example, as a local oscillator signal.

As discussed in greater detail below, the transmitter 113 is configured to modulate the received first portion of the optical signal output from laser 111 based on information input or supplied to transmitter 113. Transmitter 113, accordingly, provides a modulated optical signal Si including, in one example, at least one optical subcarrier. In other examples, however, the modulated optical signal includes multiple optical subcarriers. As further shown in FIG. 1, the modulated optical signal S1 is provided to a first port 115-1 of optical circulator 115. The modulated optical signal S1 is then output from second port 115-2 of optical circulator 115 onto bidirectional optical fiber link 130 and is transmitted to port 125-2 of circuit 125 in transceiver 120.

Modulated optical signal S1 is next directed out of port 115-3 to receiver 124, where signal S1 is mixed with the second portion of the optical signal supplied by laser 121 via splitter 122. The resulting mixing products are converted to electrical signals. Based on such electrical signals and following further processing in receiver 124, the information input to transmitter 113 is output from receiver 124.

In a similar manner, transmitter 123 is configured to modulate the received first portion of an optical signal output from laser 121 based on information input or supplied to transmitter 123. Transmitter 123, therefore, provides a modulated optical signal S2 including, in one example, at least one optical subcarrier. In other examples, however, modulated optical signal S2 includes multiple optical subcarriers. As further shown in FIG. 1, the modulated optical signal S1 is provided to a first port 125-1 of optical circulator 125. The modulated optical signal S2 then is output from second port 121-2 of optical circulator 125 onto bidirectional optical fiber link 130 and is transmitted to port 115-2 of circuit 115 in transceiver 110.

Modulated optical signal S2 is next directed out of port 115-3 to receiver 114, where signal S2 is mixed with the second portion of the optical signal supplied by laser 111 via splitter 122. The resulting mixing products are converted to electrical signals. Based on such electrical signals and following further processing in receiver 124, the information input to transmitter 123 is output from receiver 114.

Although the illustrated implementation of FIG. 1 uses the lasers 111, 121 as shared transmitter/local oscillator lasers, other implementations need not do so. For example, the transmitter 113 and the receiver 114 of the first transceiver 110 (or the transmitter 123 and the receiver 124 of the second transceiver 120) can use separate lasers in some implementations.

As shown in FIG. 2, the system 100b is substantially similar to the system 100a previously described with reference to FIG. 1, except that the transceivers 110, 120 include optical couplers 116, 126 to facilitate bidirectional communications through respective ports 116-1 to -116-3 and 126-1 to 216-3 associated with such couplers. While both transceivers 110, 120 can use either a coupler or a circulator to facilitate bidirectional communications, using circulators may reduce optical power loss in some cases.

Consistent with the present disclosure, and, in one example, the number of optical subcarriers transmitted in the uplink direction and the number of optical subcarriers transmitted in the downlink may change due to capacity requirements. However, consistent with a further aspect of the present disclosure, a sum of the number of downlink optical subcarriers and the number of uplink optical subcarriers remains the same regardless of changes in the numbers of such subcarriers. This feature of the present disclosure will next be described with reference to FIGS. 11a and 11b.

Figure 11A:
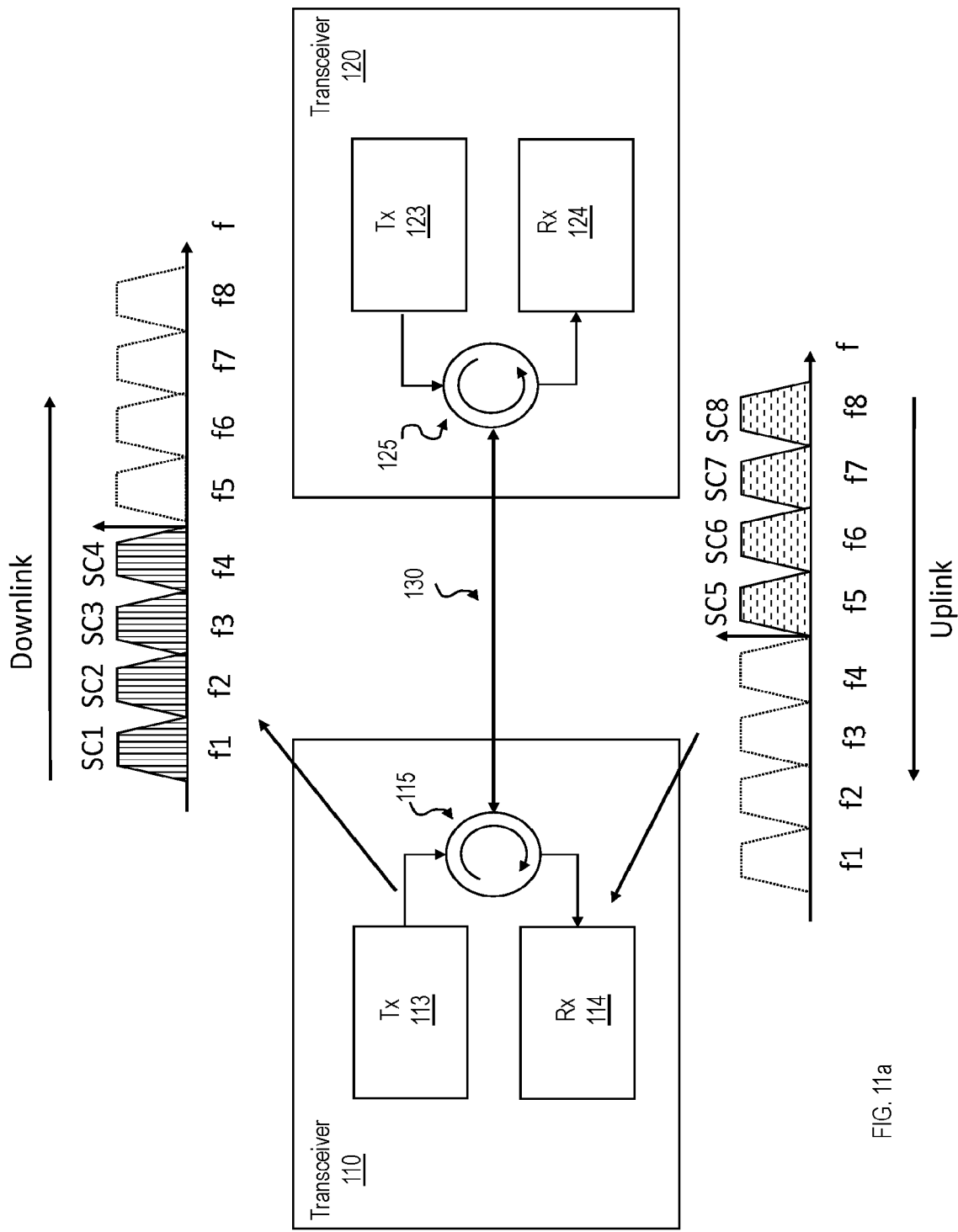
FIGS. 11a-11b are diagrams illustrating operational configurations of a point-to-point bidirectional communications system, in accordance with one or more implementations of the present disclosure.
Figure 11B:
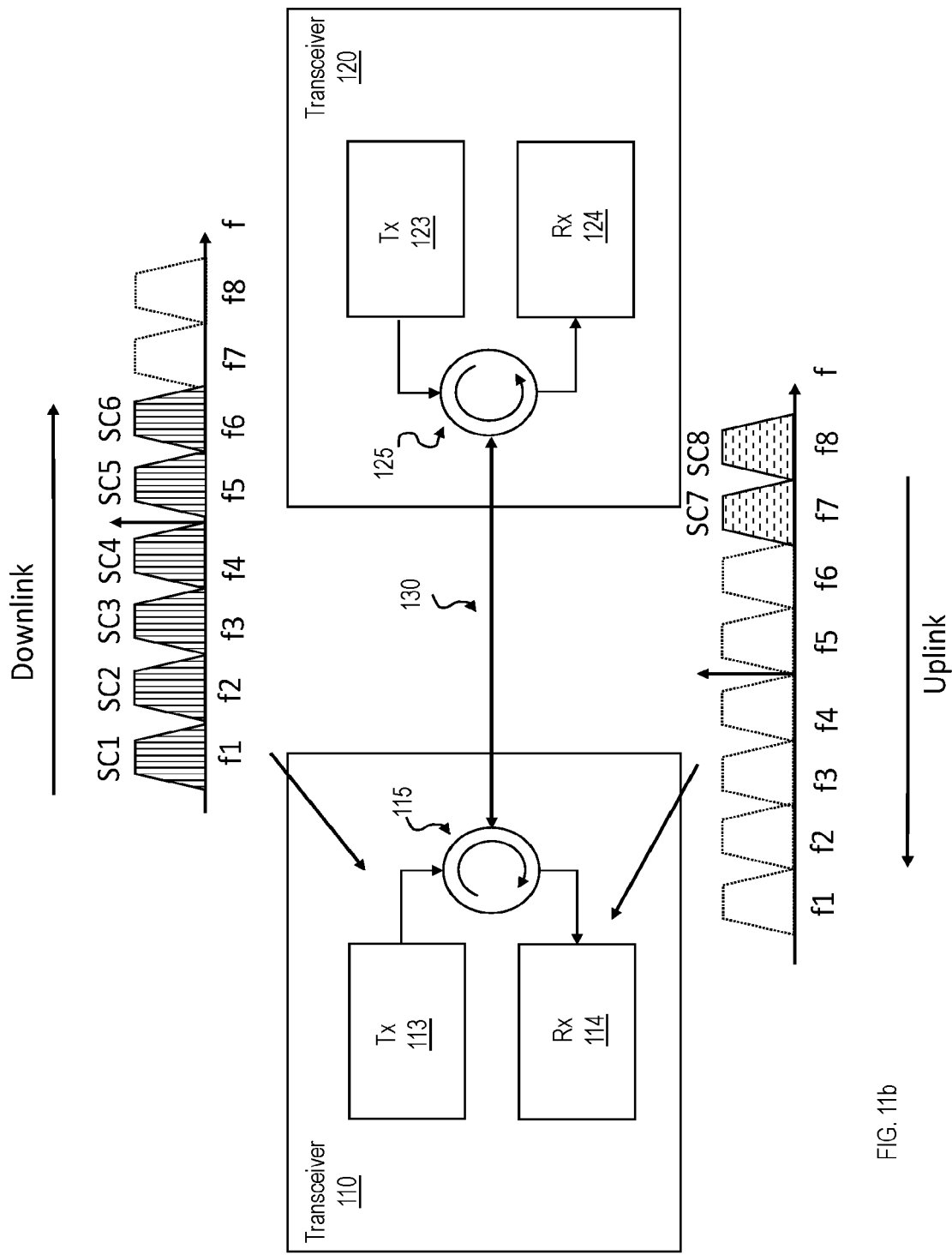

FIGS. 11a-11b are diagrams illustrating operational configurations of a point-to-point bidirectional communications system 100, in accordance with one or more implementations of the present disclosure. As previously indicated, each of the transceivers 110, 120 can deactivate a number of SCs that it transmits and/or block a number of SCs it receives. As illustrated in the example of FIG. 11a, transmitter 113 is configured to transmit only subcarriers SC1 to SC4, each of which has a respective one of frequencies f1 to f4, in the downlink direction, whereas subcarriers SC5 to SC8 are deactivated or blocked from transmission in the downlink direction. In addition, transmitter 123 is configured to transmit only subcarriers SC5 to SC8, each of which has a respective one of frequencies f5 to f8, in the uplink direction, whereas subcarriers SC1 to SC4 are deactivated or blocked in the uplink direction.

Consistent with the present disclosure, however, and, as noted above, the number of subcarriers transmitted in the uplink and downlink directions may be changed or adjusted over time. In the example shown in FIG. 11*b*, the number of optical subcarriers transmitted from transmitter 113 in the downlink direction has been changed from four to six, i.e., optical subcarriers SC1 to SC6 are output from transmitter 113. On the other hand, optical subcarriers SC7 to SC8 are deactivated or block from transmission in the downlink direction. Transmitter 123 is configured to transmit only subcarriers SC7 to SC8 in the uplink direction as opposed to transmission of subcarriers SC1 to SC4 in FIG. 11*a*. Further, subcarriers SC1 to SC6 are deactivated or blocked from upstream transmission in FIG. 11*b*. At other times, the transceivers 110, 120 may be adjusted dynamically to transmit, respectively, subsets of the SCs different from those illustrated in FIGS. 11*a* or 11*b*. Moreover, in each of these examples, the sum of uplink and downlink subcarriers remains the same in both FIG. 11*a* and FIG. 11*b*. Namely, a total number of eight subcarriers are transmitted in the uplink and downlink directions, in the examples shown in FIGS. 11*a* and 11*b*. The total number of subcarriers may differ in other implementations. Each of the optical circulators 115, 125 in FIGS. 11*a* and 11*b* can include respective ports as described in connection with FIG. 1.

In some implementations, the subcarriers are Nyquist subcarriers, which are a group of optical signals, each carrying data, wherein (i) the spectrum of each such optical signal within the group is sufficiently non-overlapping such that the optical signals remain distinguishable from each other in the frequency domain, and (ii) such group of optical signals is generated by modulation of light from a single laser. In general, each subcarrier may have an optical spectral bandwidth that is at least equal to the Nyquist frequency, as determined by the baudrate of such subcarrier. In some cases, subcarriers that are frequency-spaced according to the Nyquist frequency may fit into a 37.5 GHz channel, and are sufficiently spaced apart to remain distinguishable at the receivers.

Figure 3:
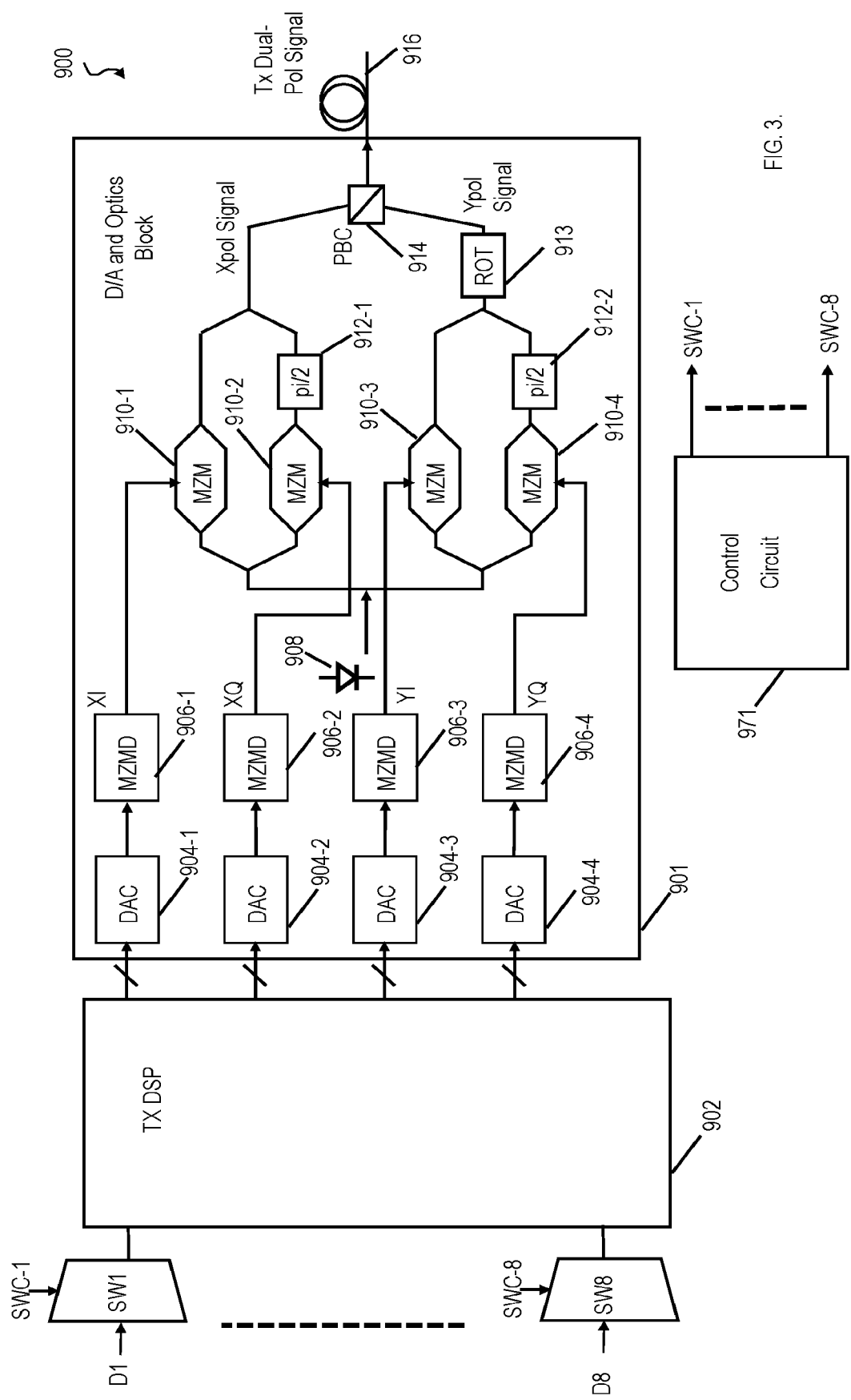
FIG. 3 is a diagram illustrating an example of a transmitter, in accordance with one or more implementations of the present disclosure.

FIG. 3 is a diagram illustrating a transmitter 900, in accordance with one or more implementations of the present disclosure. The transmitters 113, 123 discussed previously with reference to FIGS. 1-2, can include the transmitter 900. Further, as noted above, the number of optical subcarriers output from each transmitter may be changed dynamically, for example, depending on capacity requirements. Transmitter 900 is described next in greater detail. A mechanism for facilitating control of the number of transmitted optical subcarriers also is described below with reference to FIGS. 5 and 6.

The transmitter 900 includes a digital signal processor (DSP) 902, which, in the illustrated implementation, has multiple data inputs D1-D8 and switches SW1-SW8 that selectively supply data on inputs D1 to D8 to DSP 902 under control of a respective one of control signals SWC-1 to SWC-8 supplied from control circuit 971. Based on data inputs D1-D8, the DSP 902 provides multiple outputs (for example, electrical signals) to D/A and optics block 901, including digital-to-analog conversion (DAC) circuits 904-1 to 904-4, which convert digital signals received from DSP 902 into corresponding analog signals. D/A and optics block 901 also includes driver circuits 906-1 to 906-2 that receive the analog signals from DACs 904-1 to 904-4 and adjust the voltages or other characteristics thereof to provide drive signals to a corresponding one of modulators 910-1 to 910-4. A control circuit 971 is capable of generating control signals SWC-1 to SWC-8 to activate or deactivate the switches SW1-SW8 to supply data on inputs D1 to D8 to DSP 902 selectively, as noted above. In some implementations, if one of switches SW1 to SW8 is deactivated, the DSP 902 will not receive data input from that switch. Moreover, in some instances, such switch may connect the corresponding input to DSP 902 to ground. For example, if the control circuit 971 transmits a control signal SWC-1 to switch SW1 to deactivate switch SW1, the DSP 902 will not receive data on input D-1. Input D-1 may be connected to ground instead, for example.

Optical subcarriers associated with deactivated data inputs are blocked and are not transmitted. As noted above with respect to FIGS. 11*a* and 11*b,* selectively blocking optical subcarriers provides allows optical system 100 to change or re-allocate the data carrying capacity in the uplink and downlink directions flexibly. Further details of transmitters 113, 123 are described below with respect to FIG. 3, and details of DSP 902 are further described below with respect to FIG. 4. Optical subcarrier blocking, as implemented for example in DSP 902, is described in greater detail below with respect to FIGS. 5-6.

In one possible configuration, if all optical subcarriers are to be transmitted in the downlink direction from transceiver 110, for example, each of switches SW1 to SW8 coupled to DSP 902 in transmitter 113 may be configured to supply a corresponding one of data inputs D1 to D8. In that case, no optical subcarriers will be transmitted from transceiver 120 in the uplink direction.

Returning to FIG. 3, D/A and optics block 901 further includes modulators 910-1 to 910-4, each of which may be, for example, a Mach-Zehnder modulator (MZM) that modulates the phase and/or amplitude of the light output from laser 908. In some instances, the modulators 910-1 to 910-4 may collectively be referred to as a single modulator 910. The lasers 111, 121 described previously with reference to FIGS. 1-2 can be the laser 908 in FIG. 3. In the illustrated implementation, light output from laser 908, which also is included in block 901, is split, such that a first portion of the light is supplied to a first MZM pairing including MZMs 910-1 and 910-2 and a second portion of the light is supplied to a second MZM pairing including MZMs 910-3 and 910-4. The first portion of the light is further split into third and fourth portions, such that the third portion is modulated by MZM 910-1 to provide an in-phase (I) component, for example, of an X (or TE) polarization component of a modulated optical signal, and the fourth portion is modulated by MZM 910-2 and fed to phase shifter 912-1 to shift the phase of such light by 90 degrees in order to provide a quadrature (Q) component, for example, of the X polarization component of the modulated optical signal. Similarly, the second portion of the light is further split into fifth and sixth portions, such that the fifth portion is modulated by MZM 910-3 to provide an I component, for example, of a Y (or TM) polarization component of the modulated optical signal, and the sixth portion is modulated by MZM 910-4 and fed to phase shifter 912-2 to shift the phase of such light by 90 degrees to provide a Q component, for example, of the Y polarization component of the modulated optical signal.

The optical outputs of MZMs 910-1 and 910-2 are combined to provide an X polarized optical signal including I and Q components and fed to a polarization beam combiner (PBC) 914 provided in block 901. In addition, the outputs of MZMs 910-3 and 910-4 are combined to provide an optical signal that is fed to polarization rotator 913, further provided in block 901, which rotates the polarization of such optical signal to provide a modulated optical signal having a Y (or TM) polarization. The Y polarized modulated optical signal is also provided to PBC 914, which combines the X and Y polarized modulated optical signals to provide a polarization multiplexed ("dual-pol") modulated optical signal onto optical fiber 916, for example, which may be included as a segment of optical fiber in the bidirectional optical link 130 described previously with reference to FIGS. 1-2.

In the illustrated example, the polarization multiplexed optical signal output from D/A and optics block 901 includes eight subcarriers SC1-SC8, for example (see also FIGS. 11a and 11b), such that each subcarrier has X and Y polarization components and I and Q components. Moreover, each subcarrier SC1-SC8 may be associated with or corresponds to a respective one of the data inputs D1-D8 received at switches SW1-SW8.

Figure 4:
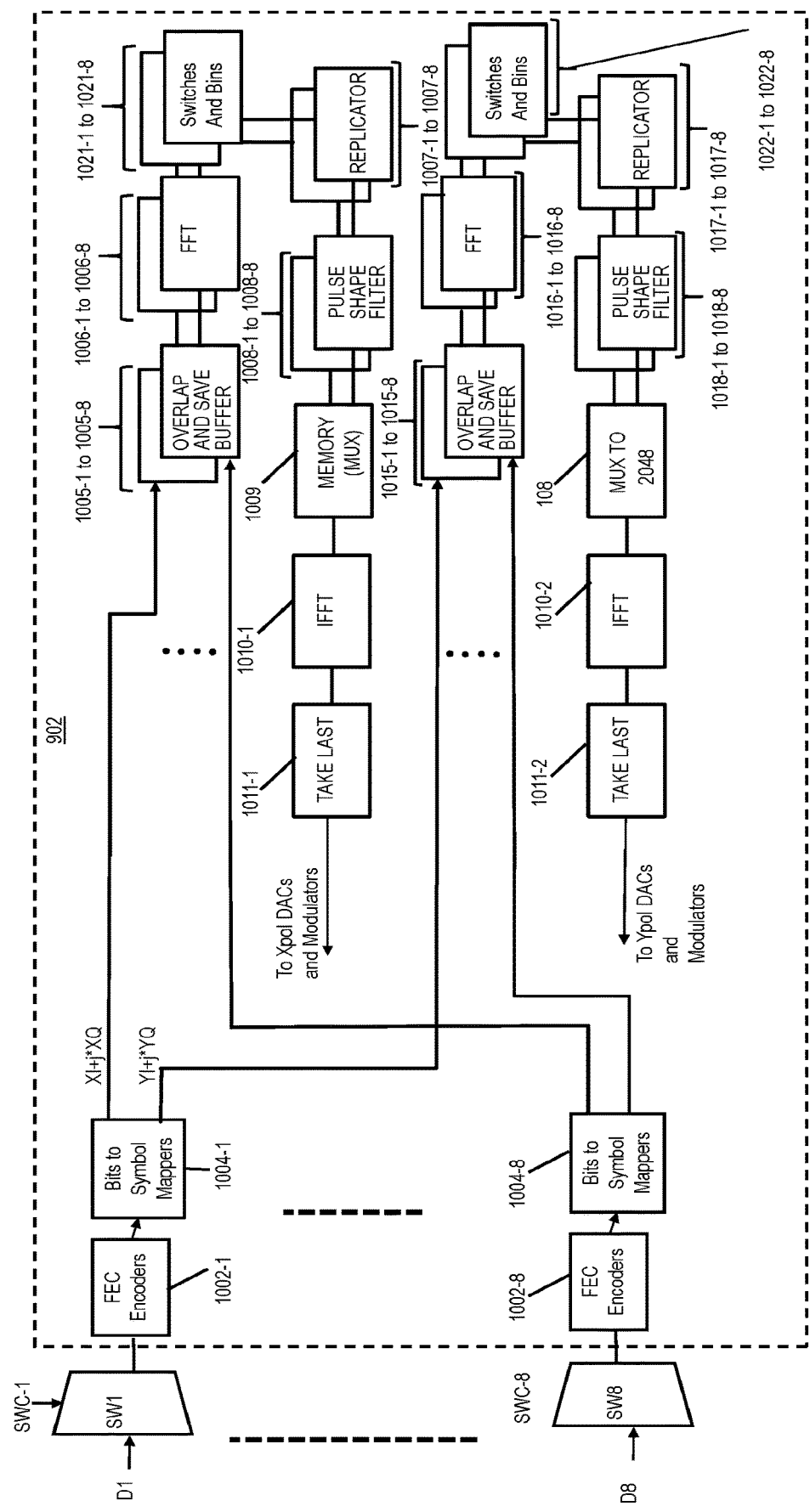
FIG. 4 is a diagram illustrating an example of a DSP circuit included in the transmitter of FIG. 3, in accordance with one or more implementations of the present disclosure.

FIG. 4 is a diagram illustrating an example of the transmitter DSP 902 (TX-DSP) included in the transmitter 900 of FIG. 3, in accordance with one or more implementations of the present disclosure. TX DSP 902 includes forward error correction (FEC) encoders 1002-1 to 1002-8, each of which may receive one or more of a respective one of a plurality of the data inputs D1 to D8 from switches SW1 to SW8. FEC encoders 1002-1 to 1002-8 carry out forward error correction coding on a corresponding one of the data input D1 to D8 (output from switches SW1 to SW8), such as, by adding parity bits to the received data. The FEC encoders 1002-1 to 1002-8 also are capable of provide timing skew between the subcarriers to correct for skew introduced during transmission over one or more optical fibers. In addition, the FEC encoders 1002-1 to 1002-8 are capable of interleaving the received data.

Each of the FEC encoders 1002-1 to 1002-8 provides an output to a corresponding one of a plurality of bits-to-symbol circuits, 1004-1 to 1004-8 (collectively referred to herein as "bits-to-symbol circuits 1004"). Each of the bits-to-symbol circuits 1004 is capable of mapping the encoded bits to symbols on a complex plane. For example, bits-to-symbol circuits 1004 can map four bits to a symbol in a dual-polarization quadrature phase shifting key (QPSK) constellation. Each of the bits-to-symbol circuits 1004 provides first symbols, having the complex representation XI+j*XQ, associated with a respective one of the data input, such as D1, to DSP portion 1003. Data indicative of such first symbols may carried by the X polarization component of each subcarrier SC1-SC8 (described previously).

Each of the bits-to-symbol circuits 1004 can further provide second symbols having the complex representation YI+j*YQ, also associated with a corresponding one of data inputs D1 to D8. Data indicative of such second symbols, however, can be carried by the Y polarization component of each of subcarriers SC1 to SC8.

Each of the first symbols output from each of bits-to-symbol circuits 1004 is supplied to a respective one of first overlap and save buffers 1005-1 to 1005-8 (collectively referred to herein as overlap and save buffers 1005) that may buffer 256 symbols, for example. Each of the overlap and save buffers 1005 can receive 128 of the first symbols or another number of such symbols at a time from a corresponding one of bits to symbol circuits 1004. Thus, the overlap and save buffers 1005 can combine 128 new symbols from the bits-to-symbol circuits 1005, with the previous 128 symbols received from the bits-to-symbol circuits 1005.

Each overlap and save buffer 1005 supplies an output, which is in the time domain, to a corresponding one of fast Fourier Transform (FFT) circuits 1006-1 to 1006-8 (also referred to individually or collectively as FFTs or FFT circuits 1006). In the illustrated implementation, the output includes 256 symbols or another number of symbols. Each of the FFTs 1006 converts the received symbols to the frequency domain using or based on, for example, a fast Fourier transform. Each of the FFTs 1006 output frequency data can be transmitted to switches and bins circuitry 1021-1 to 1021-8, each of which can include a switch and 256 memories or registers, also referred to as frequency bins or points, which store frequency components associated with the input symbols converted by the FFTs 1006. Each of the replicator components 1007-1 to 1007-8 is capable of replicating the 256 frequency components associated with the switches and bins circuitry 1021-1 to 1021-8 and storing such components in 512 or another number of frequency bins (for example, for T/2 based filtering of the subcarrier) in a respective one of the plurality of replicator components. Such replication can increase the sample rate. In addition, replicator components or circuits 1007-1 to 1007-8 can arrange or align the contents of the frequency bins to fall within the bandwidths associated with pulse shaped filter circuits 1008-1 to 1008-8.

Each of the pulse shape filter circuits 1008-1 to 1008-8 is capable of applying a pulse shaping filter to the data stored in the 512 frequency bins of a respective one of the plurality of replicator components 1007-1 to 1007-8 to thereby provide a respective one of a plurality of filtered outputs, which are multiplexed and subject to an inverse FFT, as described later. Pulse shape filter circuits 1008-1 to 1008-8 calculate the transitions between the symbols and the desired subcarrier spectrum so that the subcarriers can be spectrally packed together for transmission (for example, with a close frequency separation). Pulse shape filter circuits 1008-1 to 1008-8 can also be used to introduce timing skew between the subcarriers SC1 to SC8 to correct for timing skew induced by optical links, such as the optical link 130 described previously with reference to FIGS. 1-2. Multiplexer component 1009, which can include a multiplexer circuit or memory, can receive the filtered outputs from pulse shape filter circuits 1008-1 to 1008-8, and multiplex or combine such outputs together to form an element vector.

Inverse fast Fourier transform (IFFT) circuit or component 1010-1 is capable of receiving the element vector and providing a corresponding time domain signal or data based on an IFFT. In some implementations, the time domain signal includes a rate of 64 GSample/s. For example, last buffer or memory circuit 1011-1 can select the last 1024 or another number of samples from an output of IFFT component or circuit 1010-1 and supply the samples to DACs 904-1 and 904-2 at 64 GSample/s, for example. As noted previously, DAC 904-1 is associated with the in-phase (I) component of the X pol signal and DAC 904-2 is associated with the quadrature (Q) component of the Y pol signal. Accordingly, consistent with the complex representation XI+jXQ, DAC 904-1 receives values associated with XI and DAC 904-2 receives values associated with jXQ. Based on these inputs, DACs 904-1 and 904-2 provide analog outputs to MZMD 906-1 and MZMD 906-2, respectively, as discussed previously.

Each of the bits-to-symbol circuits 1004-1 to 1004-8 outputs a corresponding one of symbols indicative of data carried by the Y polarization component of the polarization multiplexed modulated optical signal output on fiber 916. As previously indicated, these symbols can have the complex representation YI+j*YQ. Each such symbol can be processed by a respective one of overlap and save buffers

1015-1 to 1015-8, a respective one of FFT circuits 1016-1 to 1016-8, a respective one of replicator components or circuits 1017-1 to 517-8, pulse shape filter circuits 1018-1 to 1018-8, multiplexer or memory 1019, IFFT 1010-1, and take last buffer or memory circuit 1011-1, to provide processed symbols having the representation YI+j *YQ in a manner similar to or the same as that discussed above in generating processed symbols XI+j *XQ output from take last circuit 1011-1. In addition, symbol components YI and YQ are provided to DACs 904-3 and 904-4, respectively. Based on these inputs, DACs 904-3 and 904-4 provide analog outputs to MZMD 906-3 and MZMD 906-4, respectively, as discussed above.

While FIG. 4 shows DSP 902 as including a particular number and arrangement of functional components, in some implementations, DSP 902 can include additional functional components, fewer functional components, different functional components, or differently arranged functional components. In addition, typically the number of overlap and save buffers, FFTs, replicator circuits, and pulse shape filters associated with the X component may be equal to the number of data inputs, and the number of such circuits associated with the Y component may also be equal to the number of switch outputs. However, in other examples, the number of data inputs may be different from the number of these circuits.

As previously indicated, based on the outputs of MZMDs 906-1 to 906-4, one or more of optical subcarriers SC1 to SC8 can be output onto optical fiber 916 or no optical subcarriers may be output in either the uplink or downlink direction. Transmitter 900 can adjust the number of subcarriers output onto optical fiber 916 dynamically. In some implementations, a subcarrier can be deactivated by using the switches and bins circuitry 1021-1 to 1021-8, as described in greater detail below in connection with FIG. 5. In some implementations, a subcarrier can be deactivated by using the pulse shape filters 1008-1 to 1008-8, as described in greater detail below in connection with FIG. 6. In a further example, a data input associated with a deactivated subcarrier is connected to ground by a corresponding one of switches SW1 to SW8.

Figure 5:
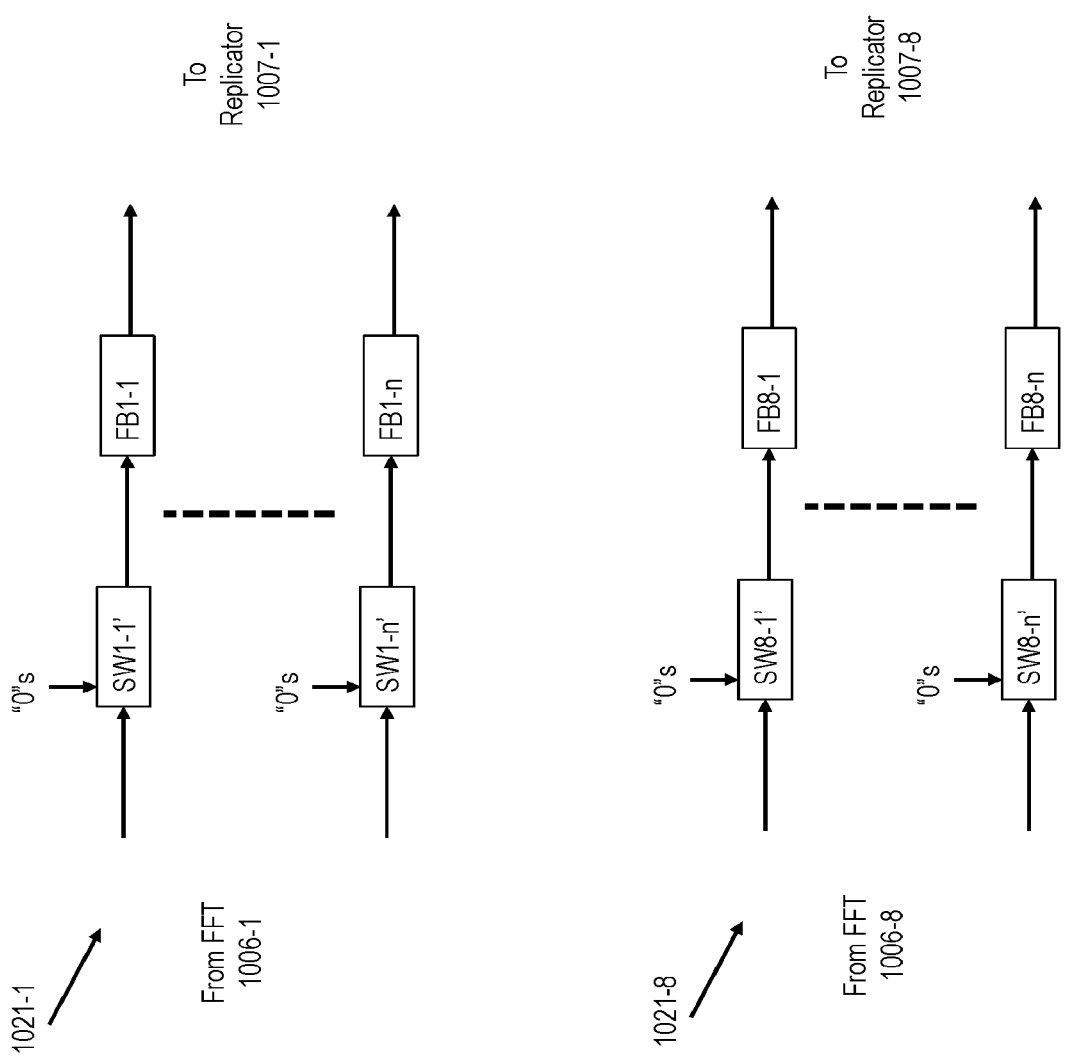
FIG. 5 is a diagram illustrating activating and deactivating subcarriers at a transmitter using switches and bins, in accordance with one or more implementations of the present disclosure.

FIG. 5 is a diagram illustrating an example of activating and deactivating subcarriers at the transmitter 900 using the switches and bins circuitry 1021-1 to 1021-8, in accordance with one or more implementations of the present disclosure. For illustrative purposes, FIG. 5 shows the switches and bin circuitry 1021-1 and 1021-8. The switches and bin circuitry 1021-1 and 1021-8 include a plurality of frequency bins (e.g., memories) FB1-1 to FB1-$n$ and FB8-1 to FB8-$n$, respectively. The plurality of frequency bins FB1-1 to FB1-$n$ and FB8-1 to FB8-$n$ are communicatively coupled to a plurality of switches SW1-1 to SW1-$n$ and SW8-1 to SW8-$n$, respectively. The plurality of switches SW1-1 to SW1-$n$ and SW8-1 to SW8-$n$ are configured to receive the frequency domain data generated by FFT 1006-1 and 1006-8, respectively. Based on the control signals CNT-1 to CNT-8, the plurality of switches SW1-1 to SW1-$n$ and SW8-1 to SW8-$n$ are configured to either provide the frequency domain data or to provide predetermined data (for example, null or "0" data) to a corresponding one of the plurality of frequency bins FB1-1 to FB1-$n$ and FB8-1 to FB8-$n$. If the predetermined data is supplied to one of the plurality of frequency bins FB1-1 to FB1-$n$ and FB8-1 to FB8-$n$, a subcarrier associated with that plurality of frequency bins is deactivated and is not output on the optical link 916. For example, in the illustrated implementation, "0" data is provided by the plurality of switches SW1-1 to SW1-$n$ and SW8-1 to SW8-$n$ to the plurality of frequency bins FB1-1 to FB1-$n$ and FB8-1 to FB8-$n$, and consequently, drive signals are applied to modulators 910, such that optical subcarriers SC1 and SC8 are deactivated or omitted from the modulated optical signal output onto fiber 916.

Figure 6:
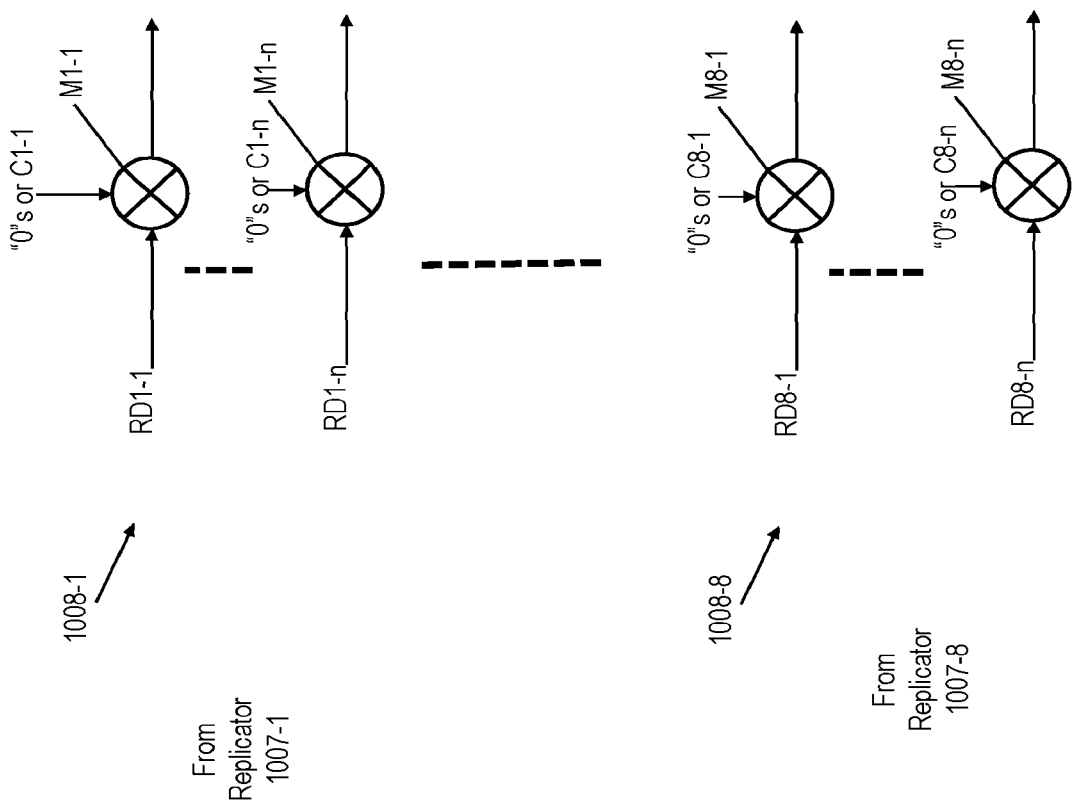
FIG. 6 is a diagram illustrating activating and deactivating subcarriers at a transmitter using pulse shape filters, in accordance with one or more implementations of the present disclosure.

FIG. 6 is a diagram illustrating activating and deactivating subcarriers at the transmitter 900 using the pulse shape filters 1008-1 to 1008-8, in accordance with one or more implementations of the present disclosure. The implementation shown in FIG. 6 may be provided as an alternative to the implementation shown in FIG. 5. For illustrative purposes, FIG. 6 shows portions of pulse shape filters 1008-1 and 1008-8 including a plurality of multiplier circuits M1-1 to M1-$n$ and M8-1 to M8-$n$, respectively, for processing the replicated data RD1-1 to RD1-$n$ and RD8-1 to RD8-$n$ from the replicators 1007-1 and 1007-8, respectively. The plurality of multiplier circuits M1-1 to M1-$n$ and M8-1 to M8-$n$ can process the replicated data RD1-1 to RD1-$n$ and RD8-1 to RD8-$n$ by multiplying the data by "0" or by a predefined value (C1-1 to C1-$n$ and C8-1 to C8-$n$). If the replicated data from a replicator is multiplied by "0", the optical subcarrier corresponding to that replicator is deactivated. For example, if the plurality of multipliers M1-1 to M1-$n$ multiply the replicated data RD1-1 to RD1-$n$ by "0", such that drive signals supplied to modulators 910 result in subcarrier SC1 being deactivated or blocked whereby SC1 is omitted from the modulated optical signal output onto fiber 916.

Figure 7:
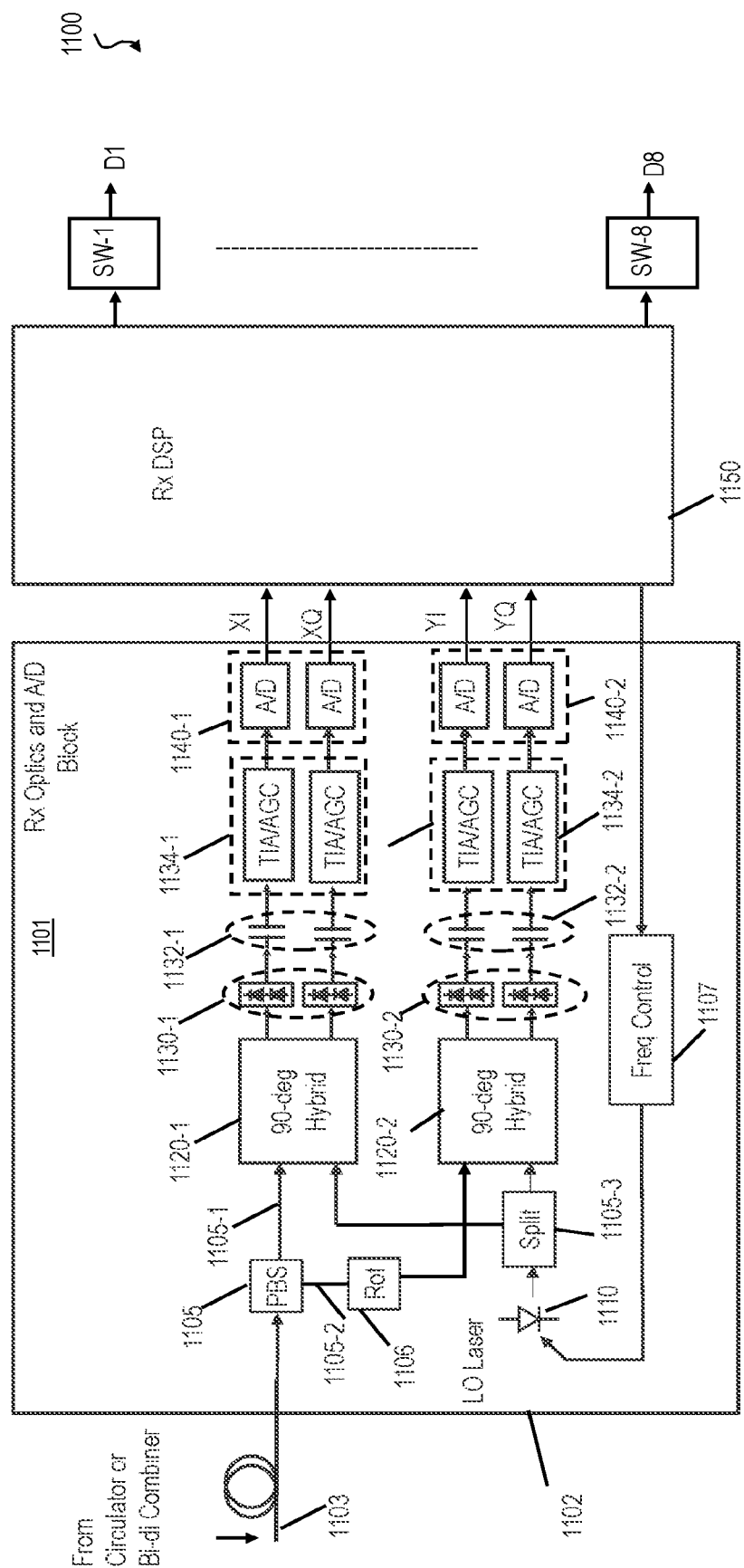
FIG. 7 is a diagram illustrating an example of a receiver, in accordance with one or more implementations of the present disclosure.

FIG. 7 is a diagram illustrating an example of a receiver 1100, in accordance with one or more implementations of the present disclosure. The receivers 114 and 124 described previously with reference to FIGS. 1-2 can include the receiver 1100. The receiver 1100 includes an Rx optics and A/D block 1101, which, in conjunction with DSP 1150, can carry out coherent detection. Block 1101 includes a polarization beam splitter (PBS) 1105 with first (1105-1) and second (1105-2) outputs, a local oscillator (LO) laser 1110, 90-degree optical hybrids or mixers 1120-1 and 1120-2 (referred to generally as hybrid mixers or optical hybrid circuits 1120 and individually as hybrid mixer or optical hybrid circuit 1120), detectors 1130-1 and 1130-2 (referred to generally as detectors or photodiode circuits 1130 and individually as detector or photodiode circuit 1130, each including either a single photodiode or balanced photodiode), AC coupling capacitors 1132-1 and 1132-2, transimpedance amplifiers/automatic gain control circuits TIA/AGC 1134-1 and 1134-2, ADCs 1140-1 and 1140-2 (referred to generally as ADCs 1140 and individually as ADC 1140), and an RX DSP 1150. As previously indicated, the LO laser 110 can be the laser 111 or a shared laser described with reference to FIGS. 1-2, or it can be a separate laser.

Polarization beam splitter (PBS) 1105 can include a polarization splitter that receives an input polarization multiplexed optical signal including optical subcarriers SC1 to SC8 supplied by optical fiber link 1103, which may be, for example, an optical fiber segment as part of one of optical communication link 130 noted previously. PBS 1105 can split the incoming optical signal into the two X and Y orthogonal polarization components. The Y component may be supplied to a polarization rotator 1106 that rotates the polarization of the Y component to have the X polarization. Hybrid mixers 1120 can combine the X and rotated Y polarization components with light from local oscillator laser 1110. For example, hybrid mixer 1120-1 can combine a first polarization signal (e.g., the component of the incoming optical signal having a first or X (TE) polarization output from PBS port 1105-1) with light from local oscillator 1110, and hybrid mixer 1120-2 can combine the rotated polarization signal (e.g., the component of the incoming optical signal having a second or Y (TM) polarization output from PBS port 1105-2) with the light from local oscillator 1110. In one example, polarization rotator 1190 may be provided at PBS output 1105-2 to rotate Y component polarization to have the X polarization.

Detectors 1130 can detect mixing products output from the optical hybrids, to form corresponding voltage signals, which are subject to AC coupling by capacitors 1132-1 and 1132-1, as well as amplification and gain control by TIA/AGCs 1134-1 and 1134-2. The outputs of TIA/AGCs 1134-1 and 1134-2 and ADCs 1140 can convert the voltage signals to digital samples. For example, two detectors or photodiodes 1130-1 can detect the X polarization signals to form the corresponding voltage signals, and a corresponding two ADCs 1140-1 may convert the voltage signals to digital samples for the first polarization signals after amplification, gain control and AC coupling. Similarly, two detectors 1130-2 may detect the rotated Y polarization signals to form the corresponding voltage signals, and a corresponding two ADCs 1140-2 may convert the voltage signals to digital samples for the second polarization signals after amplification, gain control and AC coupling. RX DSP 1150 may process the digital samples associated with the X and Y polarization components to output data D1 to D8 associated with subcarriers SC1 to SC8.

While FIG. 7 shows the receiver 1100 as including a particular number and arrangement of components, in some implementations, optical receiver 1100 includes additional components, fewer components, different components, or differently arranged components. The number of detectors 1130 and/or ADCs 1140 can be selected to implement an optical receiver 1100 that is capable of receiving a polarization multiplexed signal.

Consistent with the present disclosure, in order to demodulate subcarriers SC1 to SC8, local oscillator 1110 may be tuned to output light having a wavelength or frequency relatively close to one or more of the subcarrier wavelengths or frequencies to thereby cause a beating between the local oscillator light and the subcarriers.

In some implementations, the local oscillator 1110 includes a semiconductor laser, such as a distributed feedback laser or a distributed Bragg reflector laser, which can be tuned thermally or through current adjustment. If thermally tuned, the temperature of the local oscillator laser 1110 is controlled with a thin film heater, for example, provided adjacent the local oscillator laser 1110. Alternatively, the current supplied to the local oscillator laser 1110 can be controlled, if the local oscillator laser 1110 is current tuned.

Figure 8:
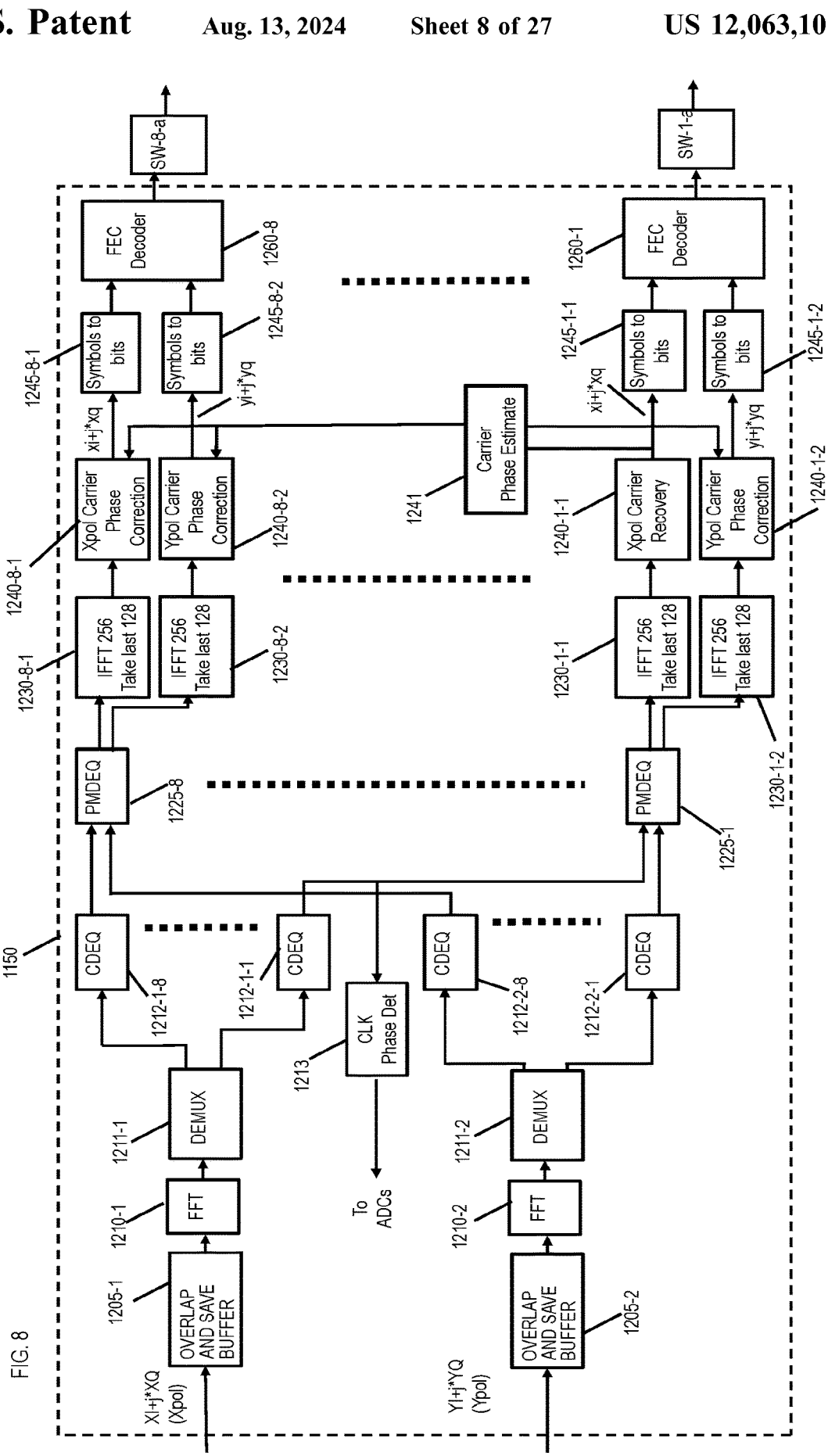
FIG. 8 is a diagram illustrating an example of a DSP circuit included in the receiver of FIG. 7, in accordance with one or more implementations of the present disclosure.

FIG. 8 is a diagram illustrating an example of the DSP 1150 included in the receiver 1100 of FIG. 7, in accordance with one or more implementations of the present disclosure. As noted above, analog-to-digital (A/D) circuits 1140-1 and 1140-2 output digital samples (sometimes referred to as internal signals) corresponding to the analog inputs supplied thereto. In some implementations, the samples are supplied by each A/D circuit at a rate of 64 GSamples/s. The digital samples correspond to symbols carried by the X polarization of the optical subcarriers and can be represented by the complex number XI+jXQ. The digital samples can be provided to overlap and save buffer 1205-1 and 1205-2. FFT component or circuit 1210-1 can receive the 2048 vector elements, for example, from the overlap and save buffer 1205-1 and convert the vector elements to the frequency domain using, for example, a fast Fourier transform (FFT). The FFT component 1210-1 can convert the 2048 vector elements to 2048 frequency components, each of which can be stored in a register or "bin" or other memory, as a result of carry outing the FFT.

The frequency components then can be demultiplexed, and groups of such components can be supplied to a respective one of chromatic dispersion equalizer circuits (CDEQ) 1212-1-1 to 1212-1-8, each of which can include a finite impulse response (FIR) filter that corrects, offsets or reduces the effects of, or errors associated with chromatic dispersion of the transmitted optical subcarriers. Each of the CDEQ circuits 1212-1-1 to 1212-1-8 supplies an output to a corresponding polarization mode dispersion (PMD) equalizer circuit 1225-1 to 1225-8.

Digital samples output from A/D circuits 640-2 associated with Y polarization components of subcarrier SC1 can be processed in a similar manner to that of digital samples output from A/D circuits 1240-1 and associated with the X polarization component of each subcarrier. Namely, overlap and save buffer 1205-2, FFT 1210-2 and CDEQ circuits 1212-2-1 to 1212-2-8 can have a similar structure and operate in a similar fashion as buffer 1205-1, FFT 1210-1 and CDEQ circuits 1212-1-1 to 1212-1-8, respectively. For example, each of CDEQ circuits 1212-2-1 to 1212-2-8 can include an FIR filter that corrects, offsets, or reduces the effects of, or errors associated with chromatic dispersion of the transmitted optical subcarriers. In addition, each of CDEQ circuits 1212-2-1 to 1212-2-8 provide an output to a corresponding one of PMDEQ circuits1225-1 to 1225-8.

The output of one of the CDEQ circuits, such as CDEQ 1212-1-1 may be supplied to clock phase detector circuit 1213 to determine a clock phase or clock timing associated with the received subcarriers. Such phase or timing information or data can be supplied to ADCs 1140-1 and 1140-2 to adjust or control the timing of the digital samples output from ADCs 1140-1 and 1140-2.

Each of PMDEQ circuits 1225 can include another FIR filter that corrects, offsets or reduces the effects of, or errors associated with PMD of the transmitted optical subcarriers. Each of PMDEQ circuits 1225 supplies a first output to a respective one of IFFT components or circuits 1230-1-1 to 1230-8-1 and a second output to a respective one of IFFT components or circuits 1230-1-2 to 1230-8-2, each of which can convert a 256 element vector, in this example, back to the time domain as 256 samples in accordance with, for example, an inverse fast Fourier transform (IFFT).

Time domain signals or data output from IFFT 1230-1-1 to 1230-8-1 are supplied to a corresponding one of Xpol carrier phase correction circuits 1240-1-1 to 1240-8-1, which can apply carrier recovery techniques to compensate for X polarization transmitter (for example, laser 908) and receiver (e.g., local oscillator laser 1110) linewidths. In some implementations, each carrier phase correction circuit 1240-1-1 to 1240-8-1 can compensate or correct for frequency and/or phase differences between the X polarization of the transmit signal and the X polarization of light from the local oscillator 1100 based on an output of Xpol carrier recovery circuit 1240-8-1, which performs carrier recovery in connection with one of the subcarrier based on the outputs of IFFT 1230-8-1. After such X polarization carrier phase correction, the data associated with the X polarization component can be represented as symbols having the complex representation $xi+j*xq$ in a constellation, such as a QPSK constellation or a constellation associated with another modulation formation, such as an m-quadrature amplitude modulation (QAM), m being an integer. In some implementations, the taps of the FIR filter included in one or more of PMDEQ circuits 1225 are updated based on the output of at least one of carrier phase correction circuits 1240-1-1 to 1240-8-1.

Time domain signals or data output from IFFT 1230-1-2 to 1230-8-2 are supplied to a corresponding one of Ypol carrier phase correction circuits 1240-1-2 to 1240-8-2, which can compensate or correct for Y polarization transmitter (for example, laser 908) and receiver (for example, local oscillator laser 1110) linewidths. In some implementations, each carrier phase correction circuit 1240-1-2 to 1240-8-2 compensates or corrects for frequency and/or phase differences between the Y polarization of the transmit signal and the Y polarization of light from the local oscillator 1110. After such Y polarization carrier phase correction, the data associated with the Y polarization component can be represented as symbols having the complex representation yi+j*yq in a constellation, such as a QPSK constellation or a constellation associated with another modulation formation, such as an m-quadrature amplitude modulation (QAM), m being an integer. In some implementations, the output of one of circuits 1240-1-2 to 1240-8-2 is used to update the taps of the FIR filter included in one or more of PMDEQ circuits 1225 instead of or in addition to the output of at least one of the carrier recovery circuits 1240-1-1 to 1240-8-1.

The output of carrier recovery circuits (for example, carrier recovery circuit 1240-1-1) can also be supplied to carrier phase correction circuits 1240-1-1 to 1240-801 and 1240-1-2 to 1240-8-2, whereby the phase correction circuits can determine or calculate a corrected carrier phase associated with each of the received subcarriers based on one of the recovered carriers, instead of providing multiple carrier recovery circuits, each of which being associated with a corresponding subcarrier.

Each of the symbols-to-bits circuits or components 1245-1-1 to 1245-8-1 can receive the symbols output from a corresponding one of circuits 1240-1-1 to 1240-8-1 and map the symbols back to bits. For example, each of the symbol to bits components 1245-1-1 to 1245-8-1 can map one X polarization symbol, in a QPSK or m-QAM constellation, to Z bits, where Z is an integer. For dual-polarization QPSK modulated subcarriers, Z is four. Bits output from each of component 1245-1-1 to 1245-8-1 are provided to a corresponding one of FEC decoder circuits 1260-1 to 1260-8.

Y polarization symbols are output form a respective one of circuits 1240-1-2 to 1240-8-2, each of which having the complex representation yi+j*yq associated with data carried by the Y polarization component. Each Y polarization, like the X polarization symbols noted above, can be provided to symbols to a corresponding one of bit to symbol circuits or components 1245-1-2 to 1245-8-2, each of which having a similar structure and operating a similar manner as symbols-to-bits component 1245-1-1 to 1245-8-1. Each of circuits 1245-1-2 to 1245-8-2 can provide an output to a corresponding one of FEC decoder circuits 1260-1 to 1260-8.

Each of FEC decoder circuits 1260 can remove errors in the outputs of symbol-to-bit circuits 1245 using forward error correction. Such error corrected bits, which can include user data for output, can be supplied as a corresponding one of outputs D1 to D8. While FIG. 8 shows DSP 1150 as including a particular number and arrangement of functional components, in some implementations, DSP 1150 includes additional functional components, fewer functional components, different functional components, or differently arranged functional components.

In some implementations, the receiver 1100 is configured to adjust the number of subcarriers it detects and processes by blocking subcarriers. In some implementations, blocking the subcarriers includes deactivating a portion of the DSP 1150 by shutting off power to such portion of the DSP associated with the deactivated optical subcarrier. For example, the power supplied to one or more of PIVIDEQ circuit1225-1, IFFT circtuis 1230-1-1/1230-1-2, Xpol carrier recovery circuits 1240-1-1/1240-1-2, symbol-to-bits circuits 1245-1-1/1245-1-2, and FEC decoder 1260-1 can be shut off to deactivate or block output of data associated with subcarrier SC1 or to block electrical signals generated based on noise or spurious optical signals having frequencies associated with subcarrier SC1. In some implementations, blocking the subcarriers includes deactivating one of the switches SW-1-a to SW-8-a. For example, deactivating switch SW-8-a can block subcarrier SC8. In some implementations, blocking the subcarriers includes using CDEQ circuits 1212-1-8 to 1212-1-1 and/or CDEQ circuits 1212-2-1 to 1212-2-8 as described below in connection with FIG. 9.

Figure 9:
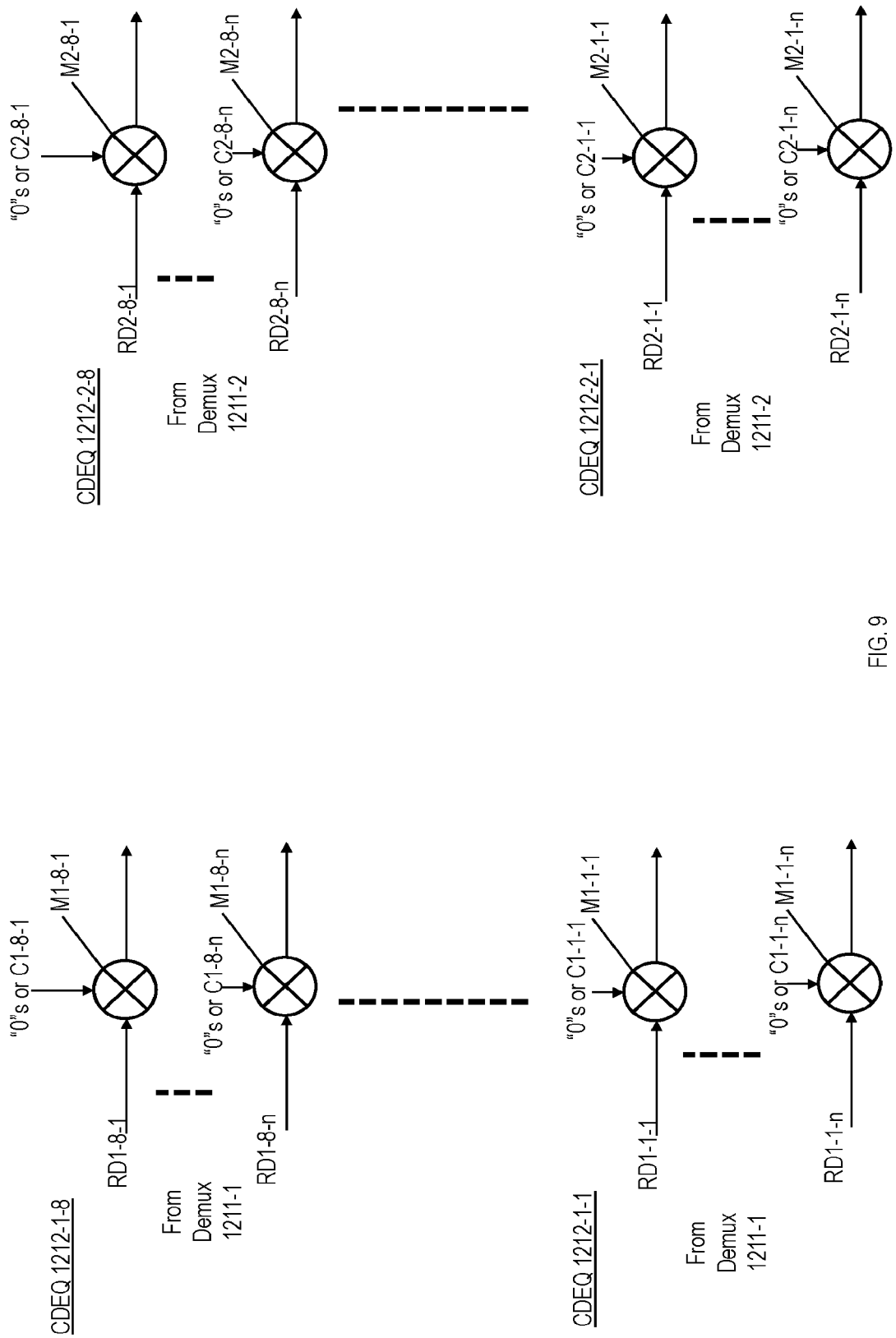
FIG. 9 is a diagram illustrating activating and deactivating subcarriers at a receiver using a chromatic dispersion equalizer circuits (CDEQ), in accordance with one or more implementations of the present disclosure.

FIG. 9 is a diagram illustrating activating and deactivating subcarriers at a receiver using a portion of a CDEQ circuit, in accordance with one or more implementations of the present disclosure. For illustrative purposes, FIG. 9 shows each CDEQ circuit 1212-1-1to 1212-1-8, 1212-2-1to 1212-2-8 including a respective group of multiplier circuits M1-1-1 to M1-1-*n*, M1-8-1 to M1-8-*n*, M2-1-1 to M2-1-*n*, and M2-8-1 to M2-8-*n*. Each pair of multiplier circuit groupings is associated with a corresponding one of optical subcarriers SC1 to SC8. For example, multiplier circuit groupings M1-1-1 to M1-1-*n* and M2-1-1 and M2-1-*n* is associated with optical subcarrier SC1. In addition, multiplier circuit groupings M1-8-1 to M1-8-*n* and M2-8-1 and M2-8-*n* is associated with optical subcarrier SC8. Each multiplier circuit processes a corresponding output RD from demultiplexer 1211. For example, as further shown in FIG. 9, multiplier circuits M1-8-1 to M1-8-*n*, M2-1-1 to M2-1-*n*, and M2-8-1 to M2-8-*n* can process internal signals RD1-1-1 to RD1-1-*n*, RD1-8-1 to RD1-8-*n*, RD2-1-1 to RD2-1-*n*, and RD2-8-1 to RD2-8-*n*, respectively, received from demultiplexers 1211-1 and 1211-2. The processing can include multiplying the internal signals by "0" or by a predefined value (e.g., C1-1-1 to C1-1-*n*, C1-8-1 to C1-8-*n*, C2-1-1 to C2-1-*n*, and C2-8-1 to C2-8-*n*). If the internal signal is multiplied by "0", the subcarrier corresponding to that pair of CDEQs circuits or multiplier circuit groupings is blocked. For example, if the plurality of multipliers M1-1-1 to M1-1-*n* and M2-1-1 to M2-1-*n* multiply the internal signal RD1-1-1 to RD1-1-*n* by "0", the subcarrier SC1 is blocked.

Thus, by selectively blocking and unblocking subcarriers as described above, the number of subcarriers transmitted in the uplink and downlink directions may be adapted or reconfigured based on capacity requirements. Also, spurious electrical signals generated by noise, such as back reflection, may effectively be cancelled out within the receiver DSP.

Figure 10:
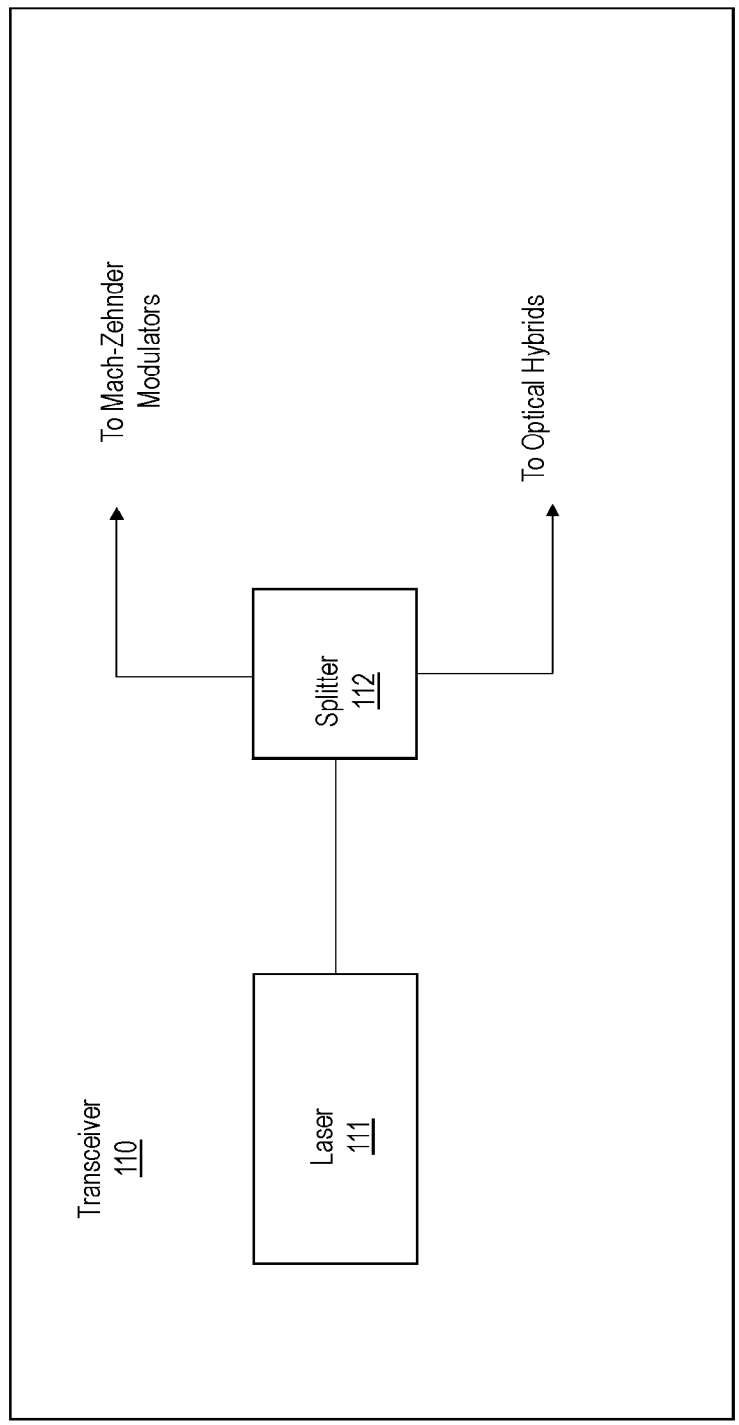
FIG. 10 is a diagram illustrating an example of a transceiver using a single laser for both transmitting and local oscillation operations, in accordance with one or more implementations of the present disclosure.

FIG. 10 is a diagram illustrating an example of the transceiver 110 using a shared laser 111 providing optical signals both for transmission and reception (as a local oscillator signal) in accordance with one or more implementations of the present disclosure. As shown, the laser 111 generates an optical signal and provides the optical signal to the splitter 112. The splitter 112 splits the optical signal into two portions. One portion is provided to the optical hybrids or mixers 1120-1 and 1120-2, while the other portion is provided to modulators 910-1 to 910-4.

Figure 12:
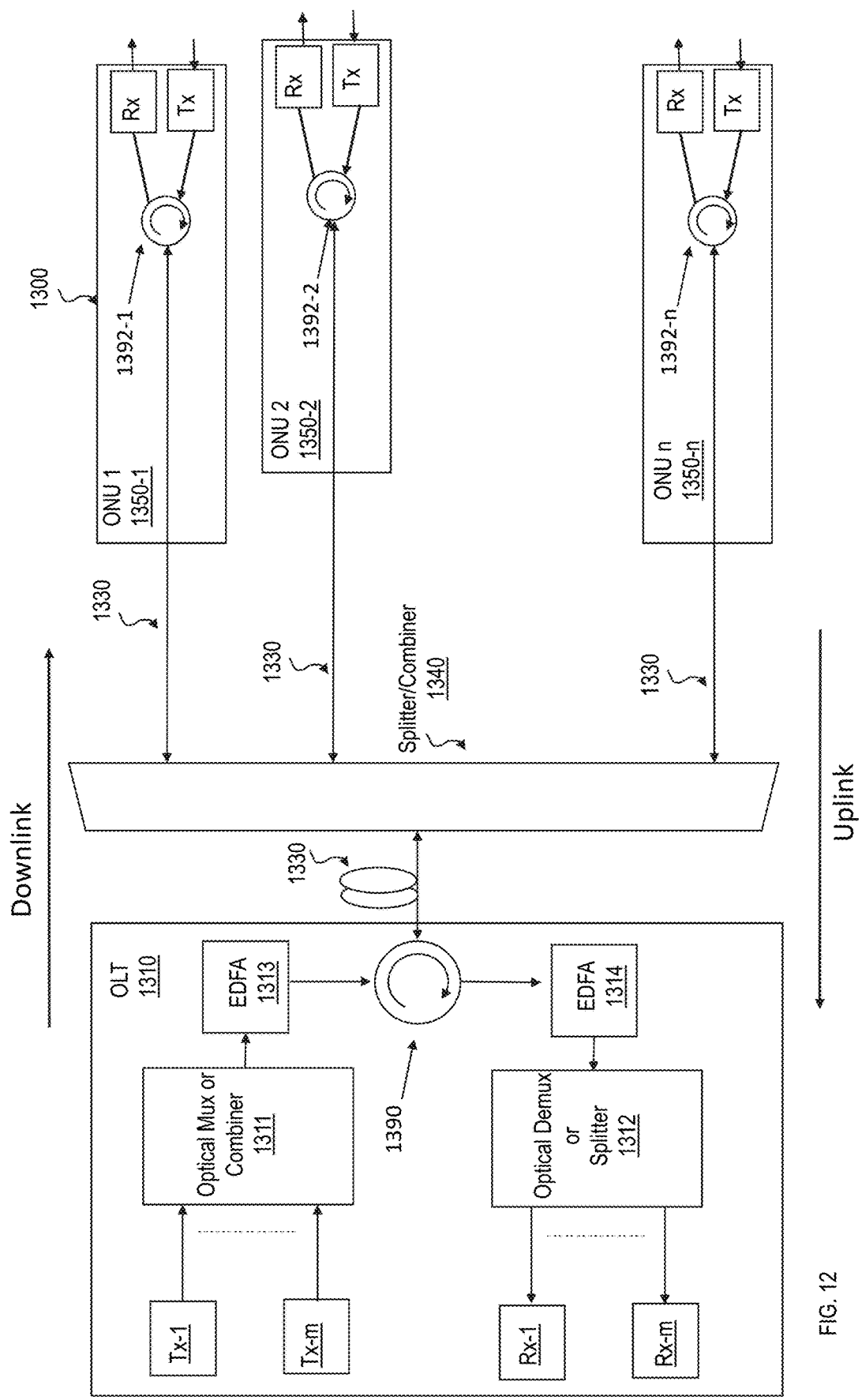
FIG. 12 is a diagram illustrating an example of a point-to-multi-point bidirectional communications system, in accordance with one or more implementations of the present disclosure.

FIG. 12 is a diagram illustrating an example of a point-to-multi-point bidirectional communications system 1300, in accordance with one or more implementations of the present disclosure. The system 1300 includes an optical line terminal (OLT) 1310 and multiple optical network units (ONUs), including ONU 1350-1, 1350-2 to 1350-n. The OLT 1310 is communicatively coupled to each of the plurality of ONUs 1350-1 to 1350-n via a bidirectional optical link 1330. The bidirectional optical link 1330 uses a splitter/combiner 1340 to facilitate communications between the OLT 1310 and each of the ONUs 1350-1-1350-n.

The OLT 1310 includes a plurality of transmitters Tx-1 to Tx-m and a plurality of receivers Rx-1 to Rx-m. Each of the plurality of transmitters Tx-1 to Tx-m and the plurality of receivers Rx-1 to Rx-m can be dedicated, respectively, to a particular channel of a plurality of channels, in which each channel is further dedicated to one of the ONUs 1350-1 to 1350-n, or one or more channels may be split or divided between multiple ONUs, such that multiple ONU transmit and receive optical subcarriers associated with the same channel. For example, transmitter Tx-1 can be dedicated to communication with ONU 1350-1 over a first channel, while transmitter TX-m can be dedicated to communication with ONU 1350-n over a second channel. In some implementations, each of the transmitters TX-1 to Tx-m are substantially similar to the transmitter 900 described previously, and therefore can generate modulated optical signals having multiple (i.e., two or more) subcarriers, while dynamically adjusting the number of subcarriers transmitted in the uplink and downlink directions. As used herein, a channel refers to a combination of subcarriers transmitted in the uplink and downlink directions, where each subcarrier is associated with a particular laser or laser frequency. For example, FIGS. 11a and 11b show an example of a channel including optical subcarriers SC1 to SC8, wherein FIG. 11a shows a first combination of uplink and downlink subcarriers and FIG. 11b shows another example of uplink and downlink subcarriers.

As further shown in FIG. 12, OLT 1310 includes an optical multiplexer or combiner 1311 for multiplexing or combining the optical signals, including optical subcarriers, transmitted from the transmitters Tx-1 to Tx-m. The multiplexed/combined signal then is transmitted to an erbium-doped fiber amplifier (EDFA) 1313 for transmission to splitter/combiner 1340 via circulator 1390, which can include respective ports as described in connection with the optical circulator 115 of FIG. 1. In some instances, the EDFA 1313 may be omitted. Splitter/combiner 1340, in turn, provides a power split portion of the combined optical signal output from circulator 1390 onto link 1330. Each such power split portion is supplied to a corresponding one of ONUs 1350a to 1350n. Each of the plurality of receivers Rx-1 to Rx-m can include the receiver 1100 described previously, and therefore can receive a number of subcarriers from the ONUs and dynamically block output of data associated with at least some of the received number of subcarriers, as well as spurious electrical signal associated with back-reflected light generated by downlink subcarriers.

Each of the ONUs 1350-1 to 1350-n includes a transmitter (Tx) and a receiver (Rx). The transmitters can be substantially similar to the transmitter 900 discussed previously, and the receivers can be substantially similar to the receiver 1100 discussed previously. Thus, each of ONUs 1350 to 1350n can transmit in the uplink direction, over its assigned channel, zero or more subcarriers to the OLT 1310 via a corresponding one of circulators 1392-1 to 1392-n, splitter/combiner 1340, and circulator 1390. In the downlink direction, each of ONUs 1350-1 to 1350-n can receive, over its assigned channel, zero or more subcarriers from the OLT 1310 via circulator 1340, splitter/combiner 1340, and a corresponding one of circulators 1392-1 to 1392-n. Each of the optical circulators 1392-1 to 1392-n in FIG. 12 can include respective ports as described in connection with the optical circulator 125 of FIG. 1. Alternatively, some or all of ONUs 1350-1 to 1350-n can transmit and receive optical subcarriers associated with the same channel. The subcarriers transmitted from the ONUs 1350-1 to 1350-n are combined at the combiner 1340, and the combined subcarriers then are received by the OLT 1310, amplified by the EDFA 1314, and demultiplexed or split by the optical demultiplexer or splitter 1312. The split/demultiplexed subcarriers then are received by the receivers Rx-1 to Rx-m according to the assigned channels. In some instances, the EDFA 1314 may be omitted.

As described previously, each of the transmitters may share a laser with a receiver. For example, transmitter Tx-1 can share a laser with receiver Rx-1. Alternatively, transmitters and receivers can have individually assigned lasers.

Figure 13:
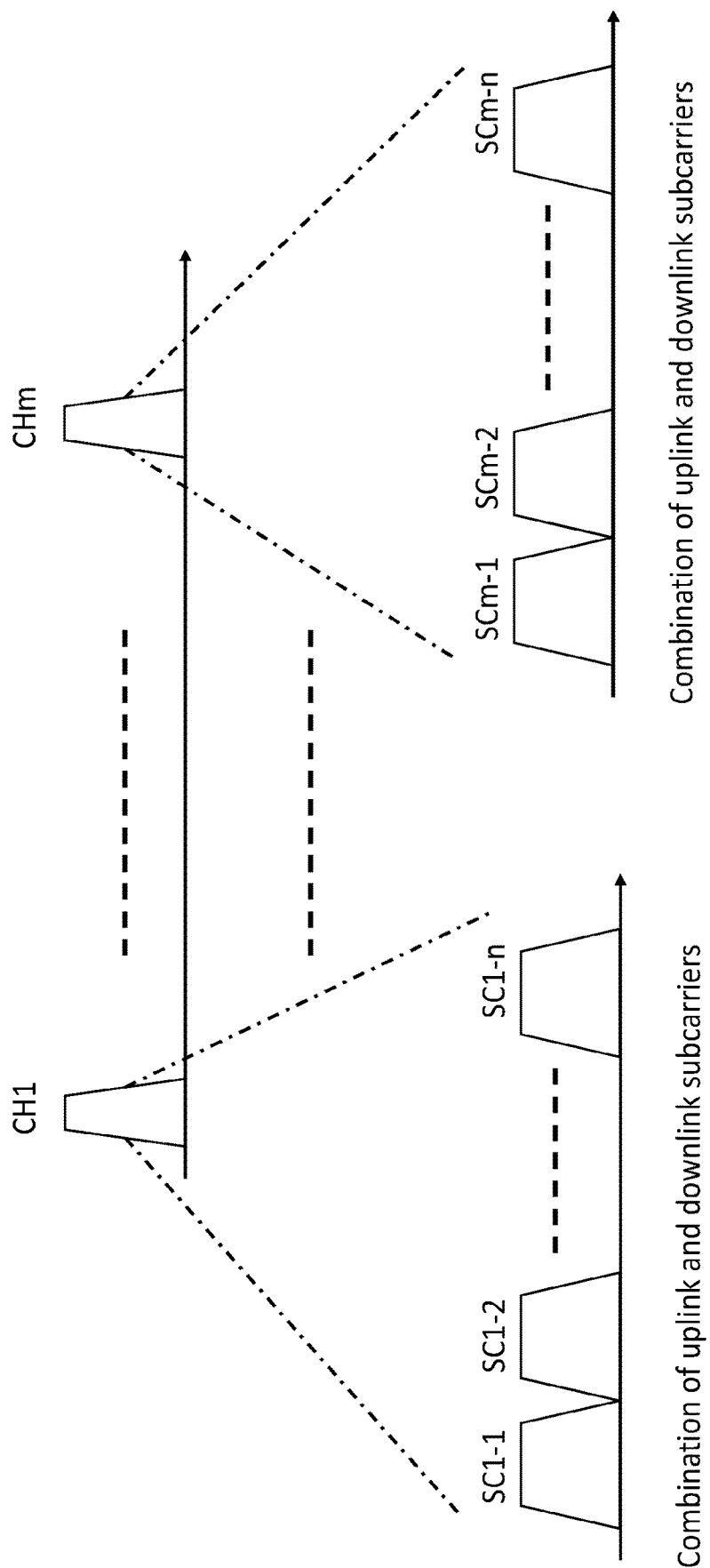
FIG. 13 is a diagram illustrating a plurality of channels, in which each channel is used to transmit a plurality of subcarriers, in accordance with one or more implementations of the present disclosure.

FIG. 13 is a diagram illustrating a plurality of channels, CH1 to CHm in which each channel includes a plurality of subcarriers. For example, channel CH1 includes subcarriers SC1-1 to SC1-n, and channel CHm includes subcarriers SCm-1 to SCm-n. With respect to channel CH1, some of subcarriers SC1-1 to SC1-n may be transmitted in the downlink direction while others may be transmitted in the uplink direction. The combination of uplink and downlink subcarriers constitutes channel 1. Similarly, some of subcarriers SCm-1 to SCm-n may be transmitted in the downlink direction while others may be transmitted in the uplink direction.

Figure 14A:
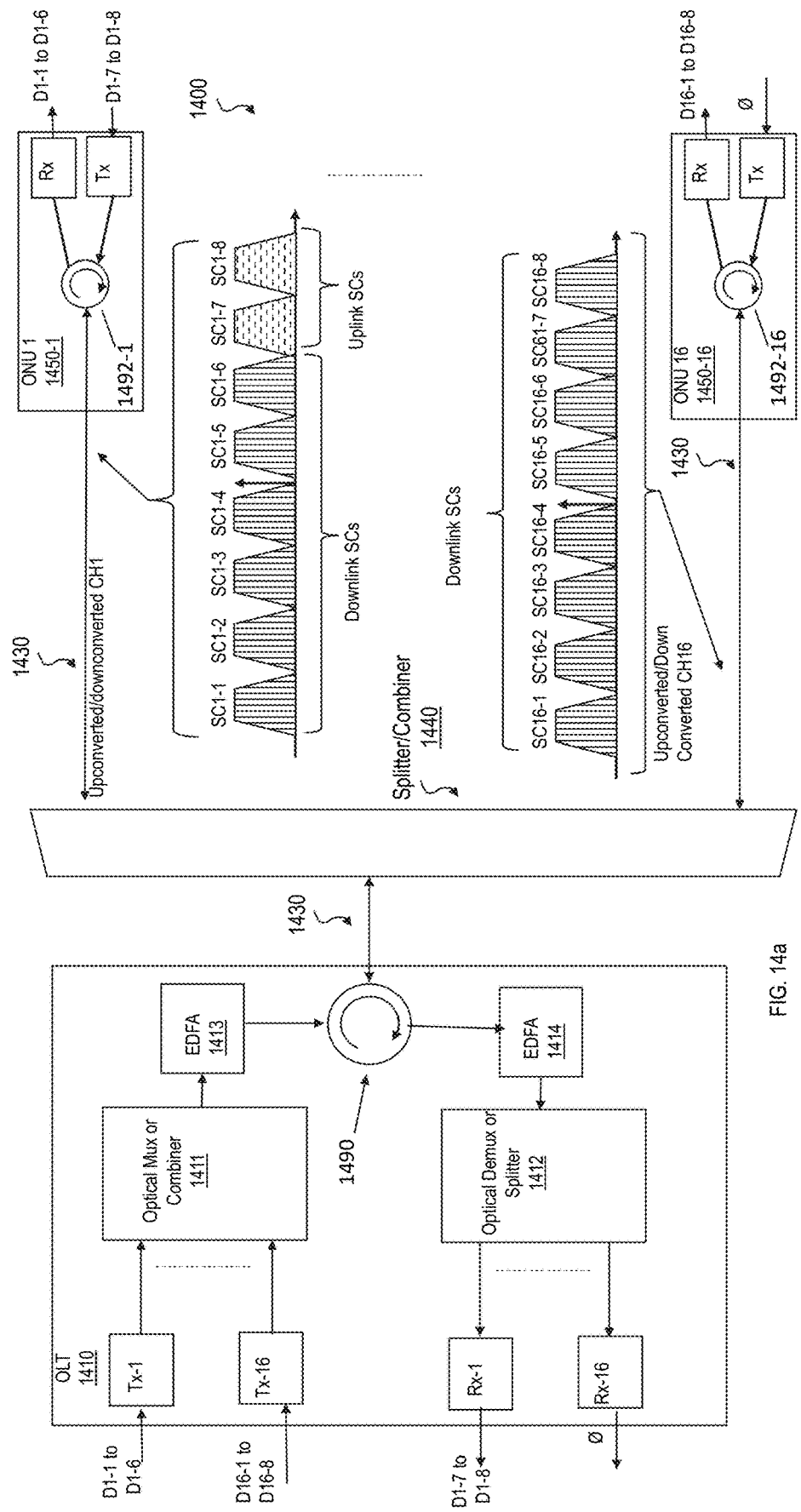
FIGS. 14a-14b are diagrams illustrating operational configurations of a point-to-multi-point bidirectional communications system, in accordance with one or more implementations of the present disclosure.
Figure 14B:
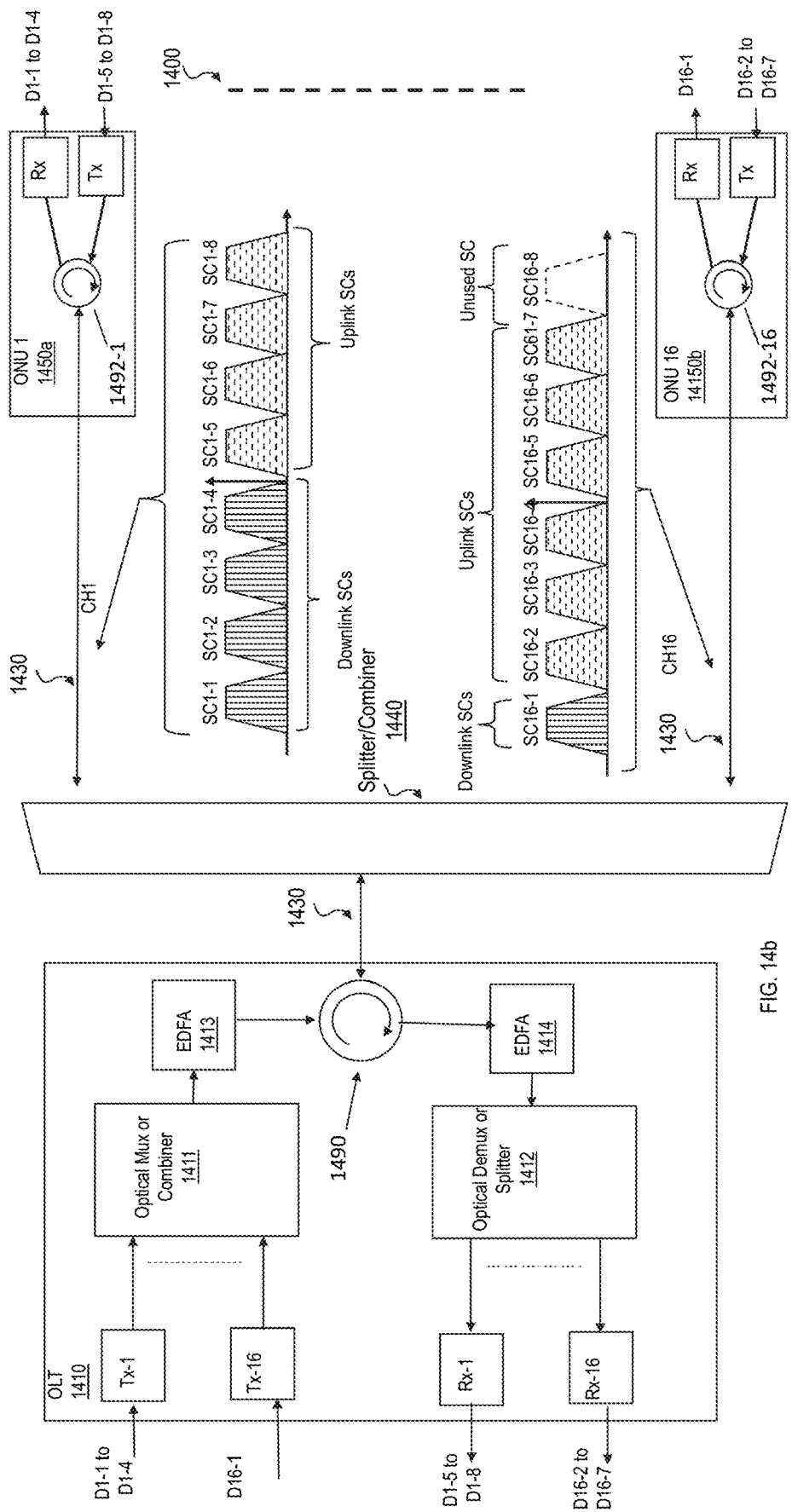

FIGS. 14a-14b are diagrams illustrating operational configurations of a point-to-multi-point bidirectional communications system 1400, in accordance with one or more implementations of the present disclosure. Both communications systems include an OLT and ONUs similar to those described above. Communications system 1400 is similar to communications system 1300 described above and includes circulator 1490 similar to circulator 1390 described above. Thus, the optical circulator 1490 can include respective ports as described in connection with the optical circulator 115 of FIG. 1. In addition, communications system 1400 includes circulators 1492-1 to 1492-16, each of which being provided in a corresponding one of ONUs 1450-1 to 1450-16. Each of circulators 1492-1 to 1492-16 are similar to circulators 1392-1 to 1392-n and can include respective ports as described in connection with the optical circulator 125 of FIG. 1.

As shown in FIG. 14a, the system 1400 includes an optical line terminal (OLT) 1410 and sixteen ONUs 1450-1 to 1450-16. The OLT 1410 is communicatively coupled to each of the ONUs 1450-1 to 1450-16 via a bidirectional optical link 1430. In the illustrated example, the bidirectional optical link 1430 uses a splitter/combiner 1440 and circulators 1490, 1492-1 to 1492-16 to facilitate communications between the OLT 1410 and each of the ONUs 1450-1 to 1450-16. The OLT 1410 includes sixteen transmitters Tx-1 to Tx-16 and sixteen receivers Rx-1 to Rx-16. Each of the transmitters Tx-1 to Tx-16 and receivers Rx-1 to Rx-16 is dedicated to a respective one of sixteen channels. For example, transmitter Tx-1 is dedicated to channel 1, while Tx-16 is dedicated to channel CH16. Additionally, each of the ONUs 1450-1 to 1450-16 is dedicated to a respective one of the sixteen channels. For example, ONU 1450-1 is dedicated to channel CH1, while ONU 1450-16 is dedicated to channel 16. Accordingly, each of the ONUs 1450-1 to 1450-16 is dedicated to one of the transmitters TX-1 to TX-16 and one of the receivers Rx-1 to Rx-16 of the OLT

1410, such that each ONU outputs data associated certain reserved subcarriers within its dedicated channel and receives data for transmission on other subcarriers within its dedicated channel.

In some implementations, each of the transmitters TX-1 to Tx-16 is substantially similar to the transmitter 900 described previously, and therefore can generate modulated optical signals, each having one or more subcarriers or no subcarriers, while dynamically adjusting the number of transmitted subcarriers. Accordingly, each of the channels can be allocated a number of subcarriers.

The OLT 1410 includes an optical multiplexer or combiner 1411 for multiplexing or combining the optical signals transmitted from the transmitters Tx-1 to Tx-16. The multiplexed/combined signal is then transmitted to an erbium-doped fiber amplifier (EDFA) 1411 and then transmitted to respective ONUs 1450-1 to 1450-16 via optical circulator 1490 to the optical link 1430 and the splitter/combiner 1440, such that each of the ONUs 1450-1 to 1450-16receives a power split portion of the modulated optical signals output from each of transmitters Tx-1 to Tx-16. In some instances, the EDFA 1411 may be omitted.

Each of the plurality of receivers Rx-1 to Rx-16 can include the receiver 1100 described previously, and therefore can receive a number of subcarriers and dynamically block, from being output, data associated with at least some of the received number of subcarriers.

Each of the ONUs 1450-1 to 1450-16 includes a transmitter and a receiver, as well as a circulator. The transmitters can be substantially similar to the transmitter 900 discussed previously, the receivers can be substantially similar to the receiver 1100 discussed previously, and the circulators can be similar to those described above. Thus each of the ONUs 1450-1 to 1450-16 can transmit, over its assigned channel, multiple (i.e., zero or more subcarriers) to the OLT 1410 and receive, over the assigned channel, multiple (i.e., two or more) subcarriers from the OLT 1410.

The subcarriers transmitted from the ONUs 1450-1 to 1450-16 are combined at the combiner 1440, the combined subcarriers are then received by the OLT 1410 via circulator 1490 provided in OLT 1410, amplified by the EDFA 1414, and demultiplexed or split by the optical demultiplexer or splitter 1412. The split/demultiplexed subcarriers then are received by the receivers Rx-1 to Rx-16 according to the assigned channels. As described previously, each of the transmitters may share a laser with a receiver. For example, transmitter Tx-1 can share a laser with receiver Rx-1. In some instances, the EDFA 1414 may be omitted.

As shown, the system 1400 of FIG. 14*a* can be configured to allocate one combination of downlink and uplink subcarriers over one channel, while allocating another combination of downlink and uplink subcarriers over a second channel. For example, as shown in FIG. 14*a*, a first channel (that is, the channel assigned to transmitter Tx-1, receiver Rx-1, and ONU 1450-1) is used to transmit subcarriers SC1-1 to SC1-6 in the downlink direction, while used to transmit subcarriers SC1-7 to SC1-8 in the uplink direction. Downstream optical subcarriers SC1-1 to SC1-6 are generated based on a respective one of data inputs D1-1 to D1-6 supplied to OLT transmitter Tx-1. Optical subcarriers SC7 and SC8 thus are blocked in the downlink direction in a manner similar to that described above. In addition, upstream optical subcarriers are based on a respective one of data streams D1-7 to D1-8 input to ONU 1 transmitter Tx, and optical subcarriers D1-1 to D1-6 are blocked in the upstream direction. As further shown in FIG. 14*a*, a power split portion of all optical signals, and associated subcarriers, is supplied to each ONU.

However, each ONU is configured, by way of the blocking mechanisms and methods described above, to output data associated with particular subcarriers, while blocking data associated with other subcarriers not intended for that ONU.

For example, as shown in FIG. 14*a*, data D1-1 to D1-6 is intended for ONU 1. Accordingly, data associated with all over subcarriers is blocked, as described above, by receiver Rx in ONU 1. Moreover, although in some instances a photodiode circuit (e.g., 1130) may receive back-reflected light from the optical fiber, such that the photodiode circuit provides electrical signals based on the optical mixing products and the back-reflected light, any back-reflected light resulting from reflections of transmitted subcarriers SC7 and SC8 along link 1430 are blocked, because spurious electrical signals generated in receiver Rx in ONU 1 corresponding to SC7 and SC8 frequencies are cancelled in the Rx DSP, as further discussed above.

A sixteenth channel (that is, the channel assigned to transmitter Tx-16, receiver Rx-16, and ONU 1450-16) is used to transmit subcarriers SC16-1 to SC16-8 in the downlink direction, while used to transmit subcarriers none of the subcarriers in uplink direction. This allocation of subcarriers can be realized by using the deactivating and blocking techniques described previously with reference to FIGS. 3-9. Further, the allocation can be changed dynamically, for example, in view of capacity requirements for the upstream and downstream links.

Such re-allocation is shown in FIG. 14*b*. Here, channel CH1 (that is, the channel assigned to transmitter Tx-1, receiver Rx-1, and ONU 1450-1) is now used to transmit subcarriers SC1-1 to SC1-4 in the downlink direction, and used to transmit subcarriers SC1-5 to SC1-8 in the uplink direction. Thus, data inputs D1-1 to D1-4 are provided to OLT transmitter Tx-1, and based on such inputs, downlink optical subcarriers are generated and processed in ONU 1 and output from receiver Rx. Further, data inputs D1-5 to D1-8 are provided to ONU 1 transmitter Tx, and based on such inputs, upstream optical subcarriers SC1-5 to SC1-8 are generated and processed by OLT receiver Rx-1 to output data streams D1-5 to D1-8.

As further shown in FIG. 14*b*, the channel CH16 (that is, the channel assigned to transmitter Tx-16, receiver Rx-16, and ONU 1450-16) is used to transmit subcarriers SC16-1 in the downlink direction, and used to transmit subcarriers SC16-2 to SC16-7 in the uplink direction. Thus, data input D16-1 is provided to OLT transmitter Tx 16, and based on such input, a downlink optical subcarrier is generated and processed in ONU 16 and output from receiver Rx of ONU 16. Further, data inputs D16-2 to D16-7 are provided to ONU 16 transmitter Tx, and based on such inputs, upstream optical subcarriers SC16-2 to SC1-7 are generated and processed by OLT receiver Rx-1 to thereby output data streams D16-2 to D16-7.

Also, as shown, subcarrier SC16-8 is unused, and can be dynamically allocated for uplink or downlink transmission as needed based, for example, on future capacity requirements.

Figure 15A:
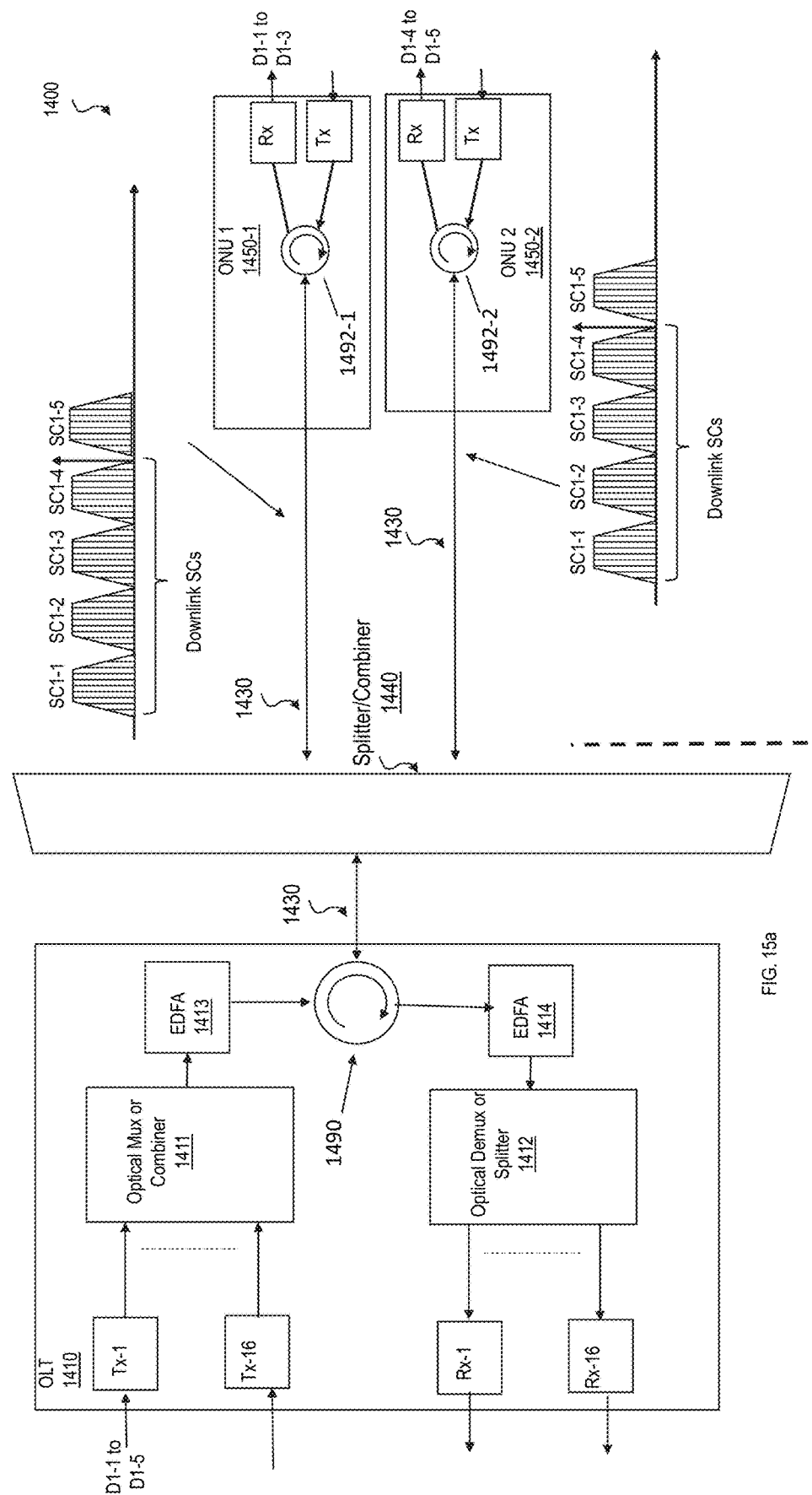
FIGS. 15a-15c are diagrams illustrating operational configurations of a point-to-multi-point bidirectional communications system in which one channel is shared amongs multiple optical network units, in accordance with one or more implementations of the present disclosure.
Figure 15B:
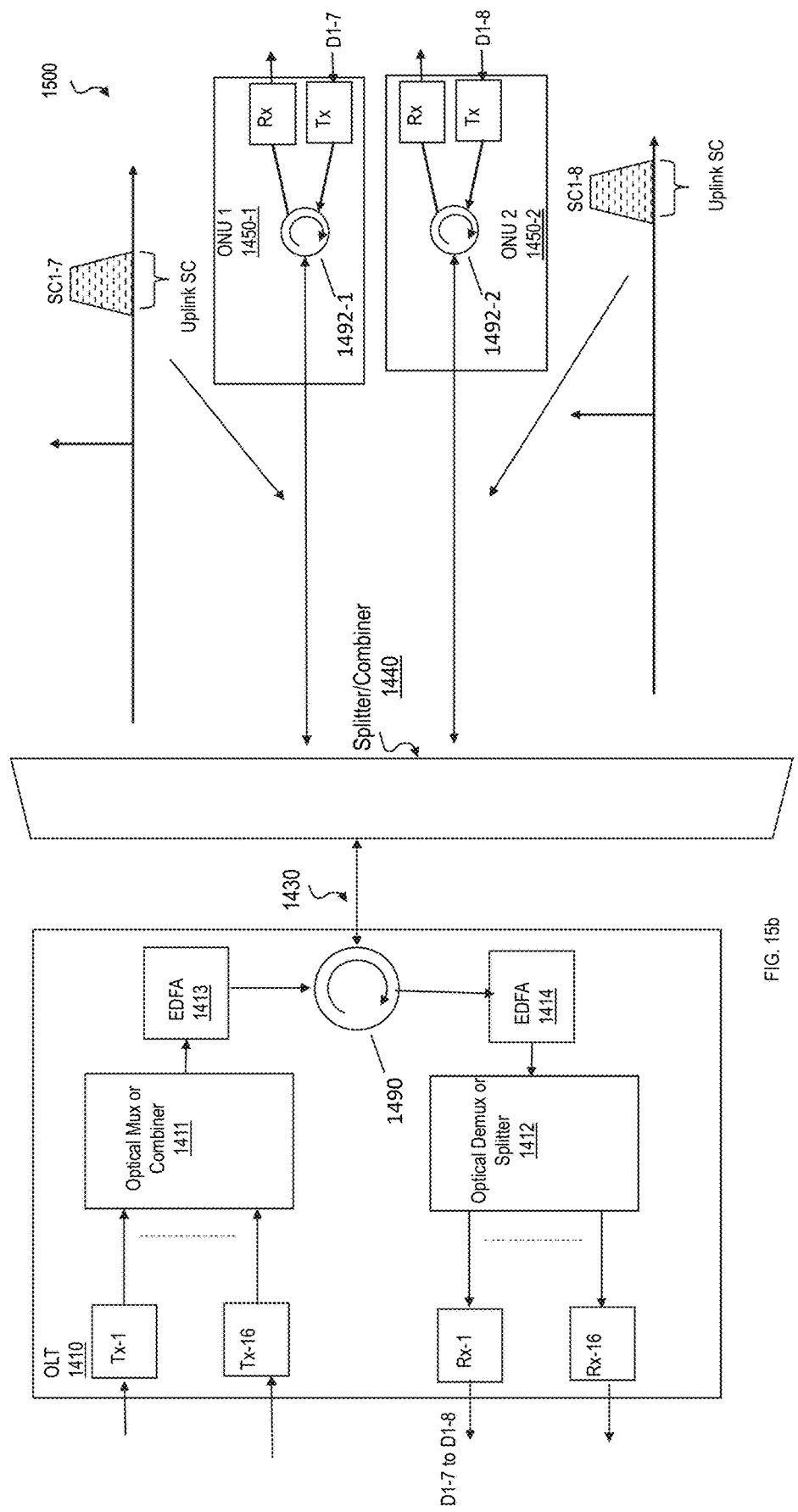
Figure 15C:
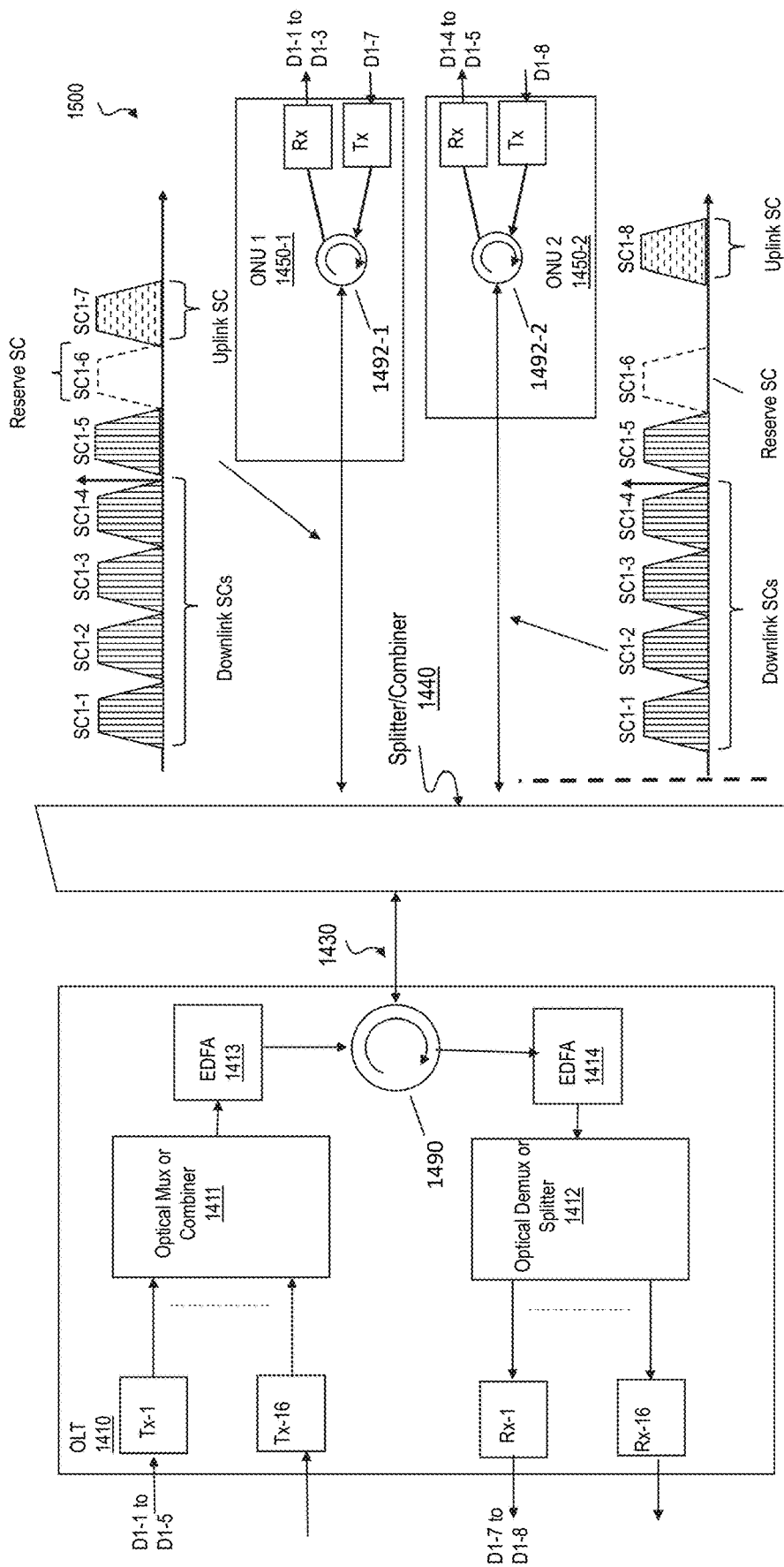

FIGS. 15*a*-15*c* are diagrams illustrating operational configurations of the point-to-multi-point bidirectional communications system 1400 in which one channel is shared amongst multiple optical network units 1450-1 to 1450-2, in accordance with one or more implementations of the present disclosure. In the example of FIG. 15*a*, the OLT 1410, ONU 1450-1 and ONU 1450-2 are assigned to a single channel, and thus are allocated subcarriers SC1-1 to subcarriers SC1-8 between them. In FIG. 15*a*, only the downlink is shown, whereby the OLT 1410 is configured to transmit subcarriers SC1-1 to SC1-5 in the downlink direction, such that both of the ONUs 1450-1 and 1450-2 receiver power a respective power split portion of optical subcarriers SC1-1 to SC1-5 via the optical link 1430 using the splitter/combiner 1440 and circulators 1490 and 1492-1/1492-2.

Transmission in the uplink direction is shown in FIG. 15b. Namely, ONU 1450-1 is configured to transmit subcarrier SC1-7 to the OLT 1410 over the optical link 1430, and ONU 1450-2 is configured to transmit subcarrier SC1-8 to the OLT 1410 over the optical link 1430.

FIG. 15c is a composite drawing showing the downlink and uplink transmission of FIGS. 15a and 15b, respectively. As shown in FIG. 15c, the channel CH1 includes a reserve subcarrier SC1-6 such that the reserve subcarrier SC1-6 can be dynamically allocated to either the OLT 1410, ONU 1450-1, or the ONU 1450-2, based, for example, on future bandwidth or capacity needs.

Figure 16:
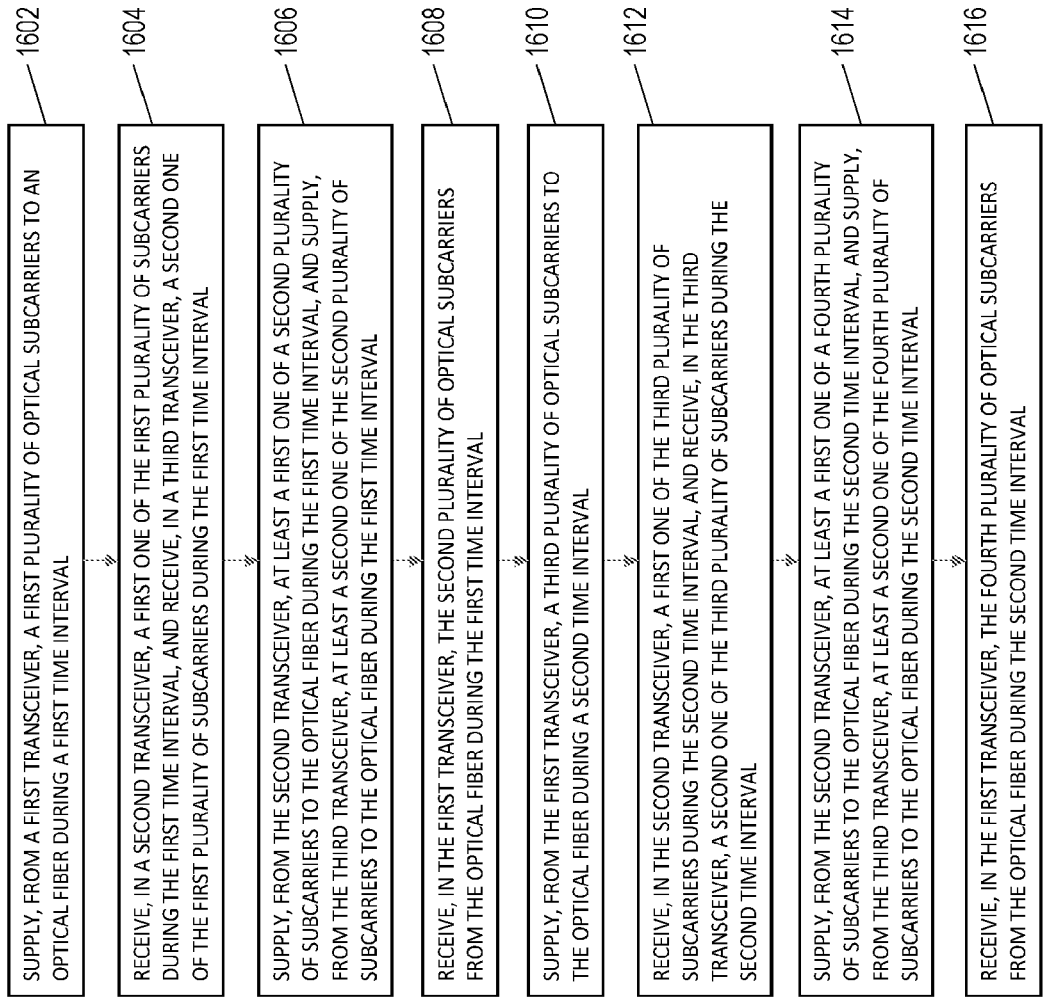
FIG. 16 is a flow chart of an example method in accordance with some implementations of the present disclosure.

FIG. 16 illustrates an example of a method in accordance with some implementations. The method can be implemented, for example, using the systems described above. As indicated by 1602, the method includes supplying, from a first transceiver, a first plurality of optical subcarriers to an optical fiber during a first time interval. As indicated by 1604, the method includes receiving, in a second transceiver, a first one of the first plurality of subcarriers during the first time interval, and receiving, in a third transceiver, a second one of the first plurality of subcarriers during the first time interval. As further indicated by 1606, the method includes supplying, from the second transceiver, at least a first one of a second plurality of subcarriers to the optical fiber during the first time interval, and supplying, from the third transceiver, at least a second one of the second plurality of subcarriers to the optical fiber during the first time interval. As indicated by 1608, the method includes receiving, in the first transceiver, the second plurality of optical subcarriers from the optical fiber during the first time interval.

As further indicated in FIG. 16, the method includes supplying, from the first transceiver, a third plurality of optical subcarriers to the optical fiber during a second time interval (1610). As indicated by 1612, the method also includes receiving, in the second transceiver, a first one of the third plurality of subcarriers during the second time interval, and receiving, in the third transceiver, a second one of the third plurality of subcarriers during the second time interval. Further, as indicated by 1614, the method includes supplying, from the second transceiver, at least a first one of a fourth plurality of subcarriers to the optical fiber during the second time interval, and supplying, from the third transceiver, at least a second one of the fourth plurality of subcarriers to the optical fiber during the second time interval. As indicated by 1616, the method also includes receiving, in the first transceiver, the fourth plurality of optical subcarriers from the optical fiber during the second time interval.

In the example of FIG. 16, a number of the first plurality of subcarriers is different from a number of the third plurality of subcarriers, and a number of the second plurality of subcarriers is different from a number of the fourth plurality of subcarriers. In some instances, a sum of a number of the first plurality of subcarriers and a number of the second plurality of subcarriers is equal to a sum of the third plurality of subcarriers and a number of the fourth plurality of subcarriers.

Figure 17:
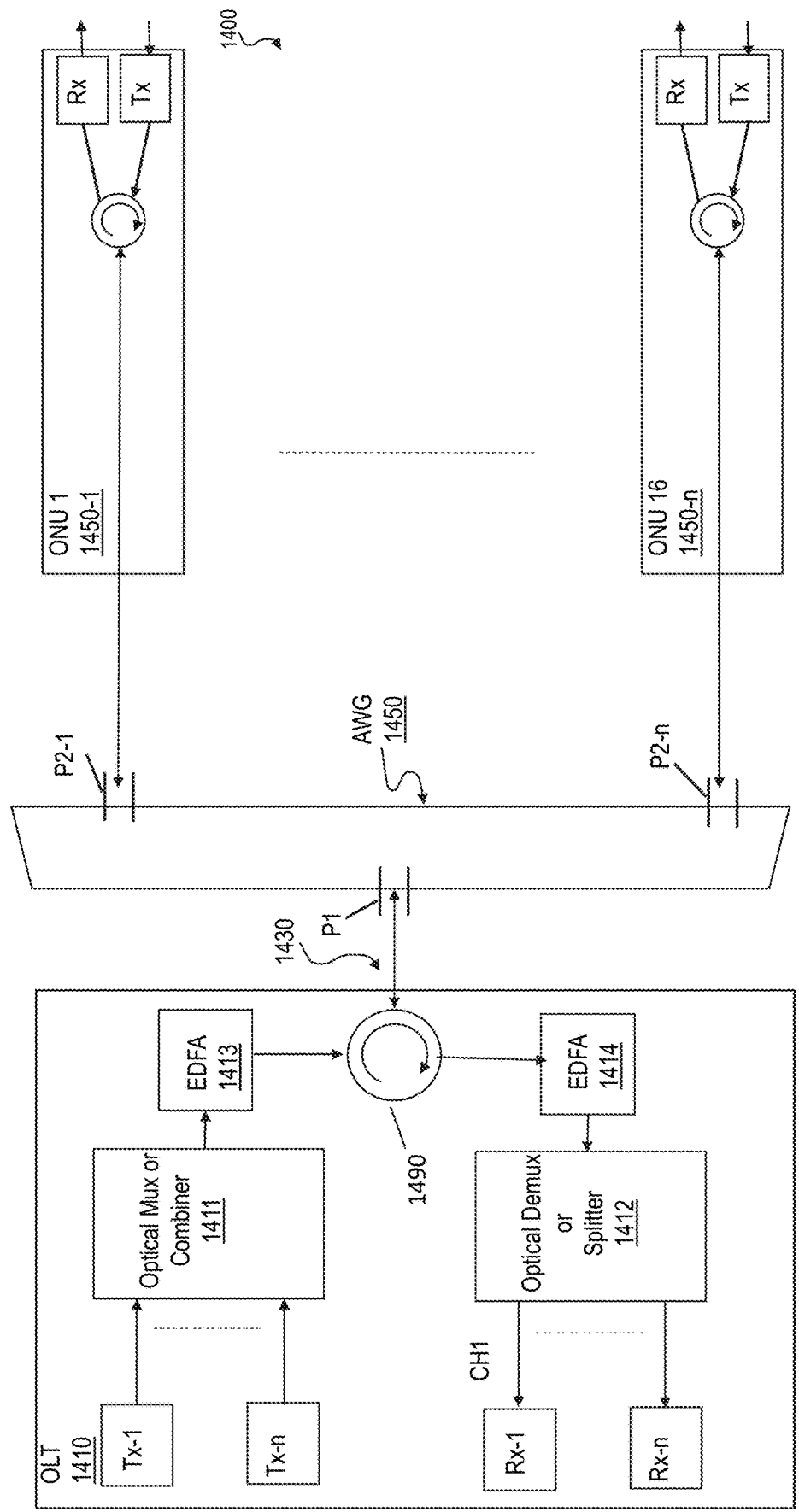
FIG. 17 is a diagram showing a point-to-multi-point bidirectional communications system that includes an arrayed waveguide grating (AWG), in accordance with one or more implementations of the present disclosure.

FIG. 17 is a diagram showing the point-to-multi-point bidirectional communications system 1400 similar to system 1300 described above, as well as the systems shown in FIGS. 14a, 14b, 15a, and 15b. In FIG. 17, however, splitter/combiner 1340 is replaced by an arrayed waveguide grating (AWG) 1470, in accordance with one or more implementations of the present disclosure. As noted above, the power/splitter provides power split portions of the OLT optical outputs to the ONUs. Here, the AWG 1470 may receive, at port P1, one more optical channels (CH) and associated downlink optical subcarriers from OLT 1410 and output each of such channels at a respective one of ports P2-1 to P2-n. Thus, the output of each port P2-1 to P2-n is wavelength-dependent, so that each such port is provides a corresponding channel (CH) and associated downlink optical subcarriers to a respective ONU. The ONUs do not receive power split portions of optical subcarriers outside of their respective intended channel (CH). The system shown in FIG. 17 otherwise operates in a similar manner as the systems described above.

Figure 18:
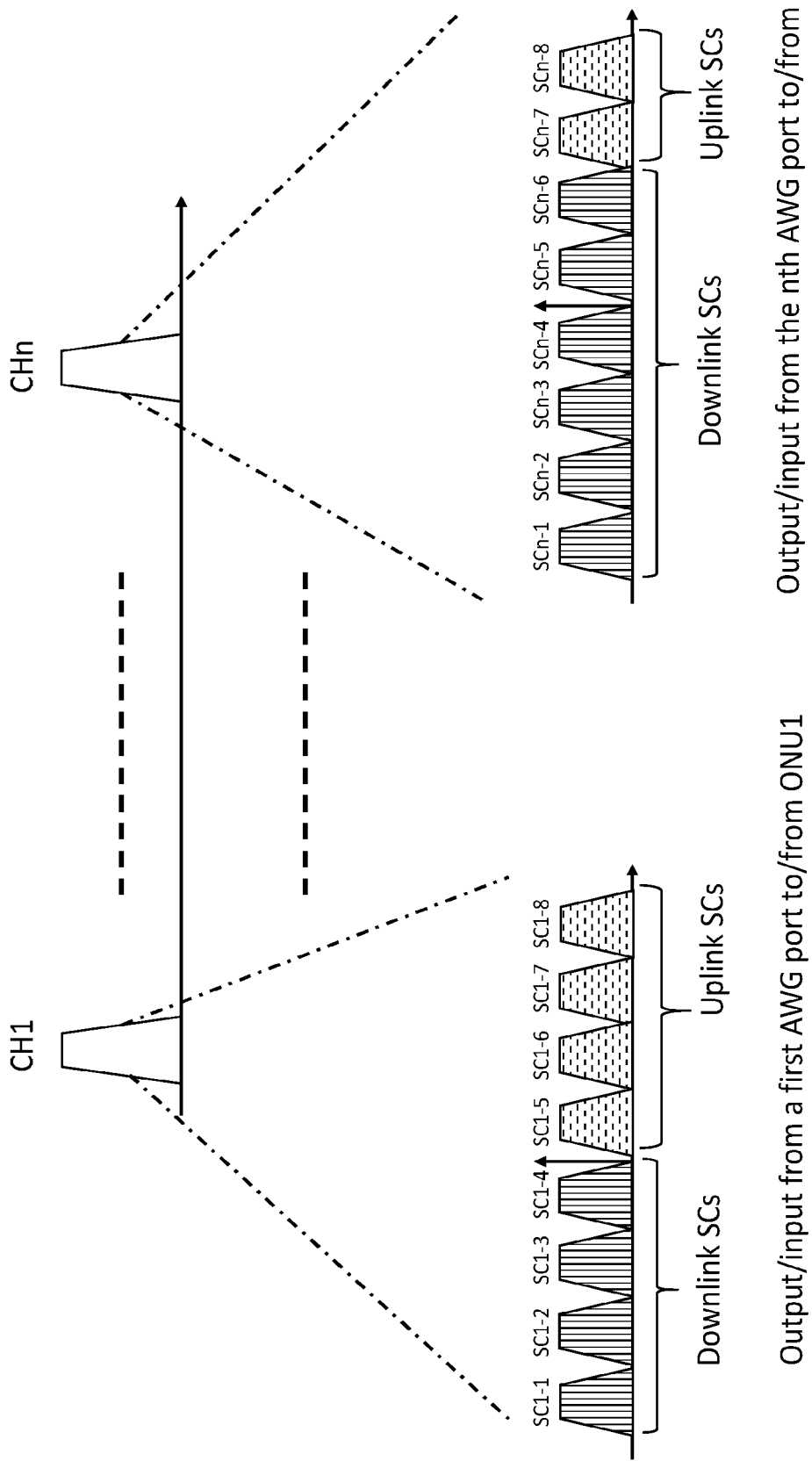
FIG. 18 is a diagram showing subcarrier inputs and outputs at the ports of an arrayed waveguide grating, in accordance with one or more implementations of the present disclosure.

FIG. 18 is a diagram showing subcarriers inputs and outputs at the ports of an arrayed waveguide grating (AWG) such as AWG 1470, in accordance with one or more implementations of the present disclosure. As shown, channel CH1 includes subcarriers SC1-1 to SC1-4 for downlink transmission and SC1-5 to SC1-8 for uplink transmission. Downlink (SC1-1 to SC1-4) and uplink (SC1-5 to SC1-8) subcarriers associated with channel CH1 are input from/output to ONU-1 only via port P2-1 of AWG 1470. In addition, in this example, downlink (SCn-1 to SCn-6) and uplink (SCn-7 to SCn-8) subcarriers associated with channel CHn are input from/output to ONU-n only via port P2-n.

Figure 19A:
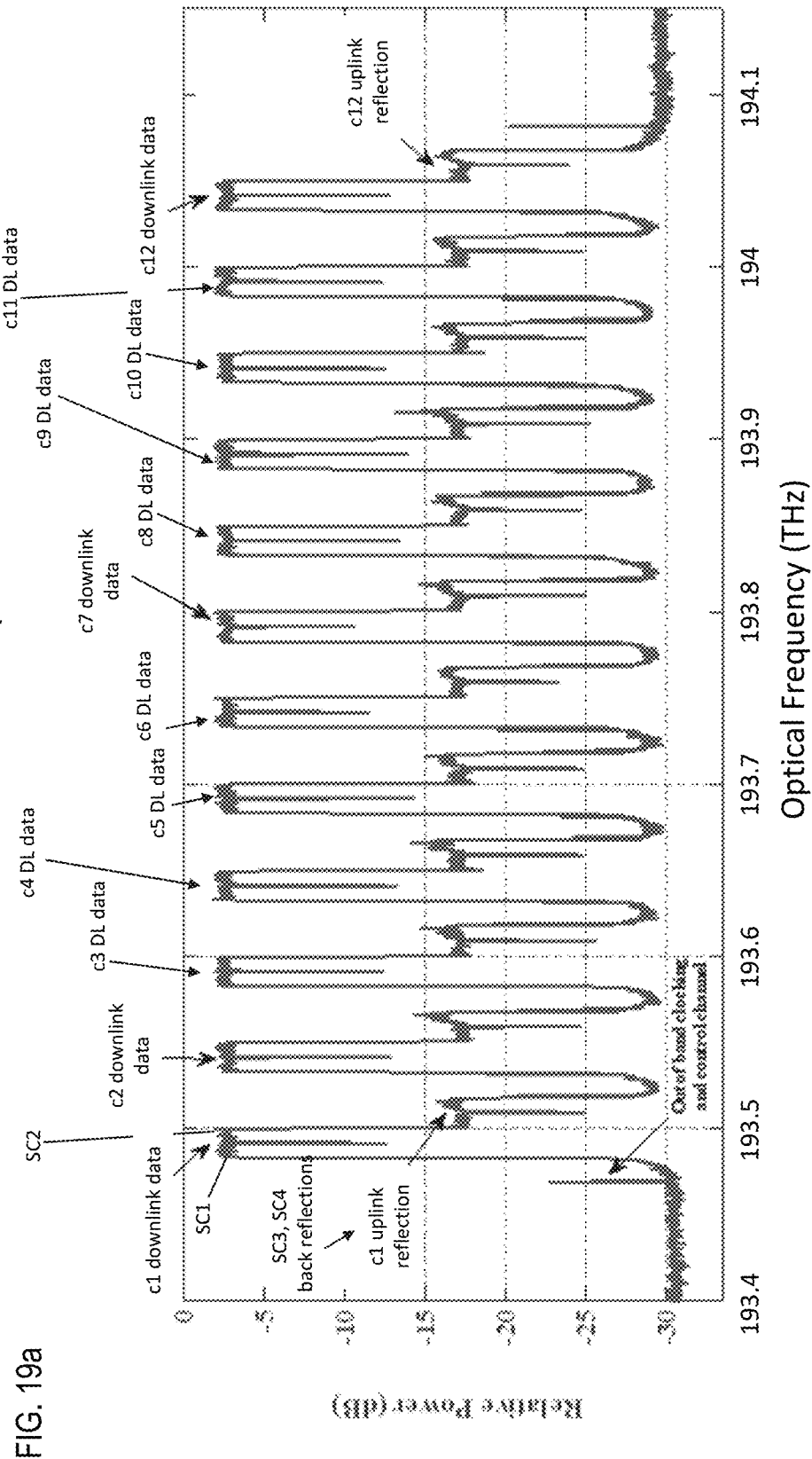
FIGS. 19a-19c are charts showing uplink and downlink received spectrums, in accordance with one or more implementations of the present disclosure.

FIG. 19a is a graph showing the downlink received spectrum in a point-to-point system providing 12 channels (c1 to c12), each of which has two uplink and two downlink subcarriers (i.e., four subcarriers total). In this example, the system includes a downlink transceiver (similar to transceiver110) at one end of a fiber optic link and an uplink transceiver (similar to transceiver 120) provided at the other end of the fiber optic link. The downlink transceiver includes a downlink transmitter (similar to Tx 113) and a downlink receiver (similar to Rx 114), and the uplink transceiver includes an uplink transmitter (similar to Tx 123) and an uplink receiver (similar to Rx 124). As shown in FIG. 19a, the uplink receiver in this system receives downlink subcarriers, such as SC1 and SC2, from the downlink transmitter. The uplink receiver also receives back reflections generated by subcarriers SC3 and SC4 transmitted upstream by the uplink transmitter to the downlink transceiver. As noted above, electrical signal associated with such back reflections are blocked or cancelled by the Rx DSP of the downlink transceiver.

Figure 19B:
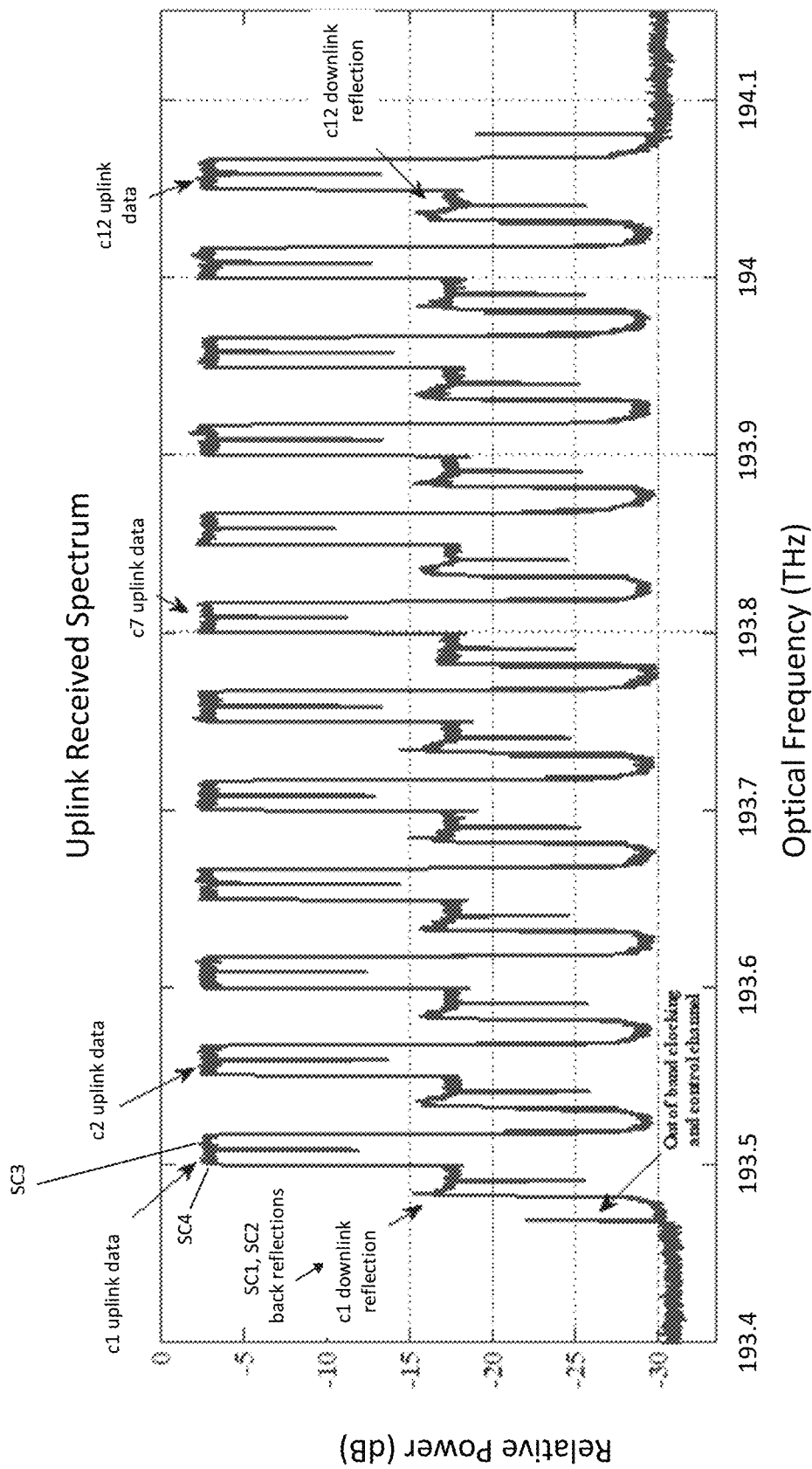

FIG. 19b is a graph showing the uplink received spectrum associated with the point-to-point system noted above with respect to FIG. 19a. Here, the downlink receiver in this system receives uplink subcarriers, such as SC3 and SC4, from the uplink transmitter. The downlink receiver also receives back reflections generated by subcarriers SC1 and SC2 transmitted downstream by the downlink transmitter to the uplink transceiver. As noted above, electrical signal associated with such back reflections are blocked or cancelled by the Rx DSP of the uplink transceiver.

Figure 19C:
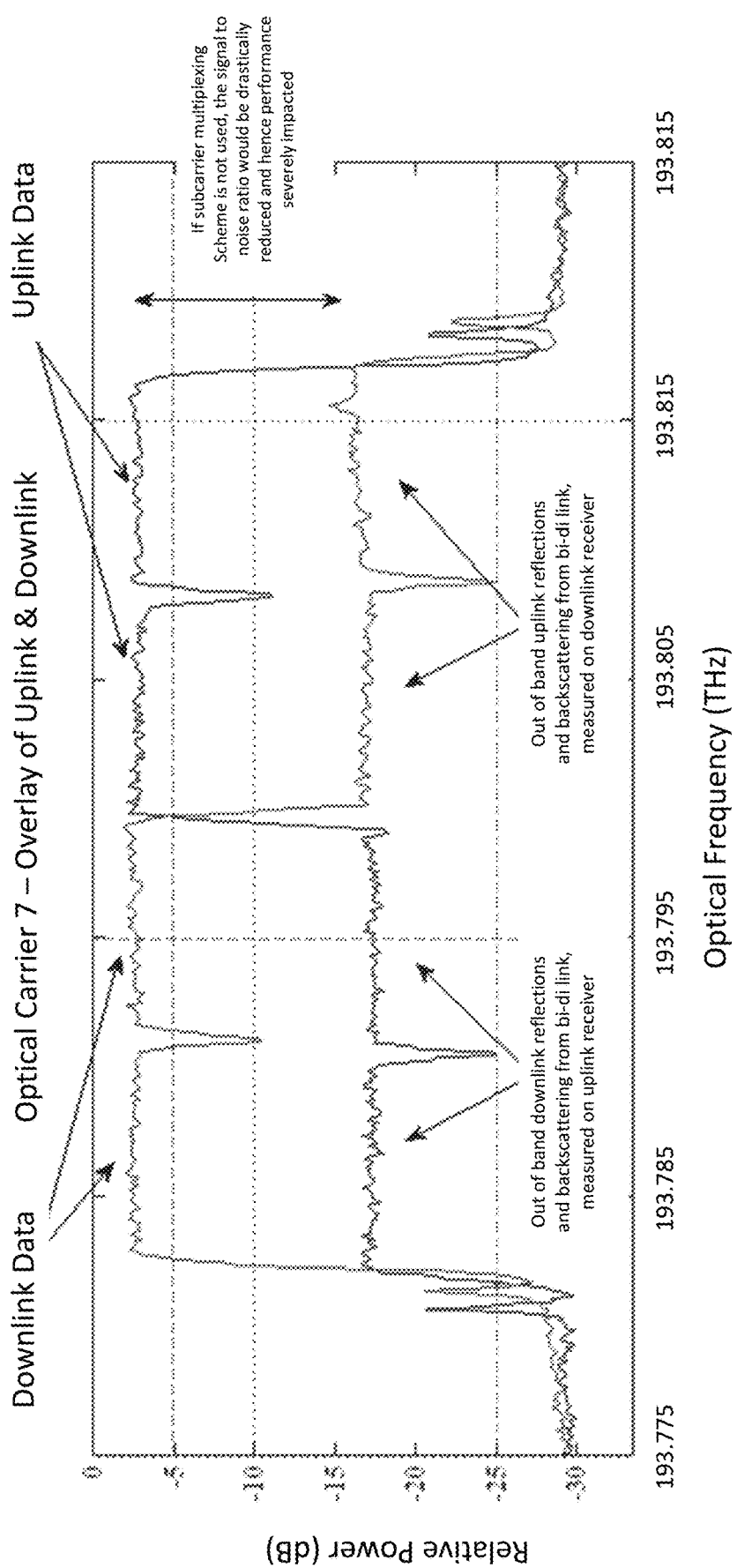

FIG. 19c shows a composite of both uplink and downlink subcarriers associated with channel c7. As indicated in FIG. 19c, in the electrical signals associated with the above-noted back reflections are suppressed or block, such that the signal to noise ratio (SNR) of the uplink and downlink subcarrier is increased compared to an approach in which such blocking is not provided.

Figure 20A:
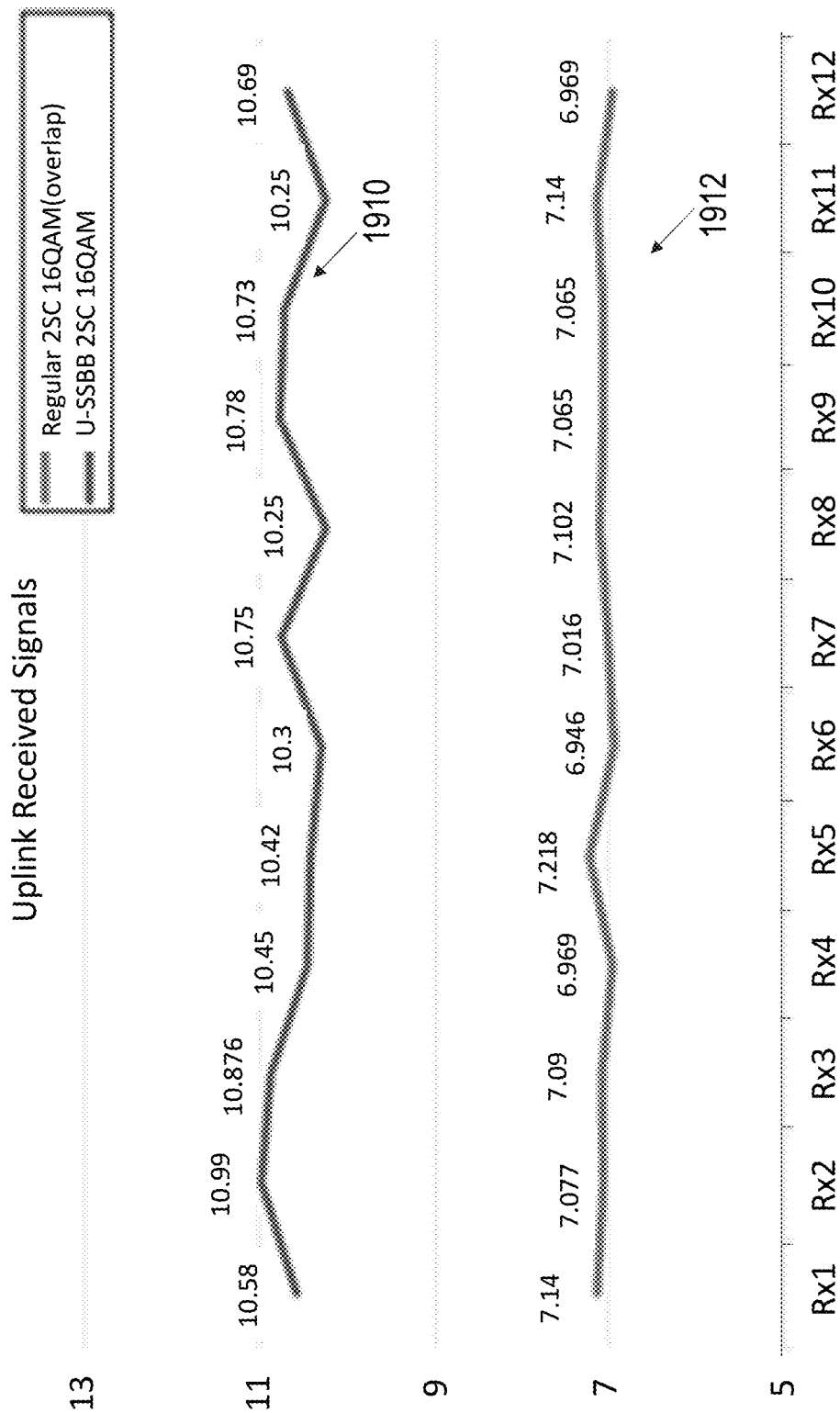
FIGS. 20a-20b are charts showing the performance of a subcarrier multiplexed system, in accordance with one or more implementations of the present disclosure, and a conventional overlapped spectral system.

FIG. 20a shows curve 1906 in which Q values (related to signal-to-noise (SNR)) are plotted for each of the downlink subcarriers associated with the 12 channels noted above in regard to FIGS. 19a and 19b. Curve 1908, in contrast, shows Q values associated with a single-sideband transmission system. Both systems employed 16 QAM modulation. As shown in FIG. 20a, Q values associated with the blocking techniques and circuitry noted above have higher values than those achieve in a conventional system in which such techniques and circuitry are not employed.

Figure 20B:
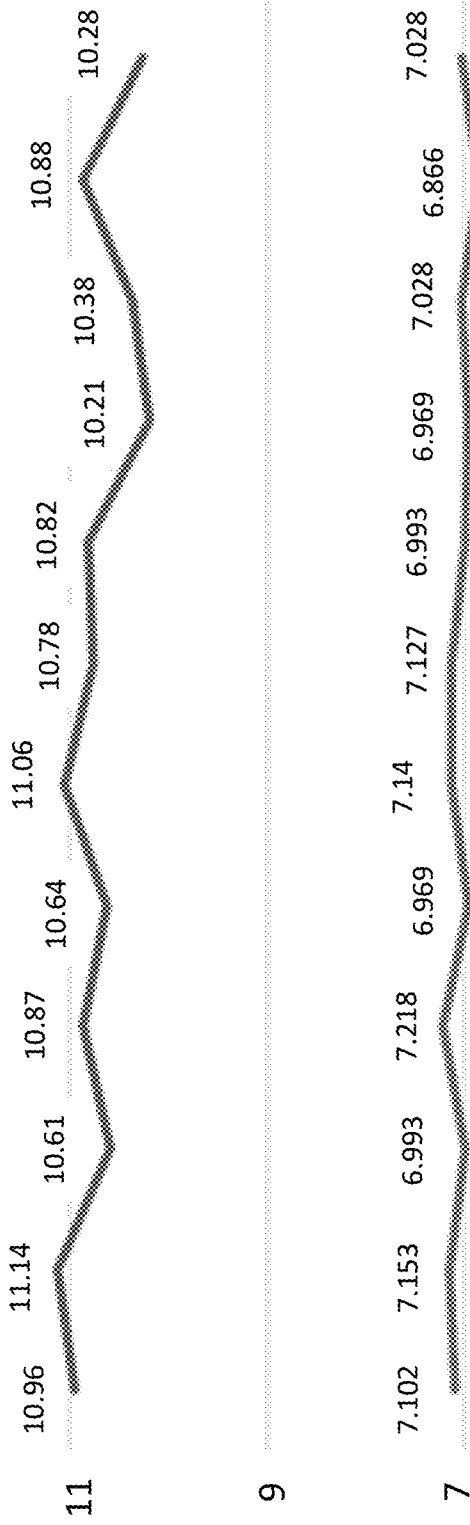

FIG. 20b shows curve 1910 in which Q values are plotted for each of the downlink subcarriers associated with the 12 channels noted above in regard to FIGS. 19a and 19b. FIG. 20b also shows Q values obtained with the conventional single side band system. Here, also higher Q values were obtained based on the blocking techniques and circuitry described above.

Various aspects of the disclosure and the functional operations described in this specification may be implemented in digital electronic circuitry, or in computer software, firmware, or hardware, including the structures disclosed in this specification and their structural equivalents, or in combinations of one or more of them. Likewise, various aspects of the disclosure may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

In some instances, various processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

Although a few implementations have been described in detail above, other modifications are possible. For example, the logic flows depicted in the figures do not necessarily require the particular order shown, or sequential order, to achieve desirable results. In addition, other actions may be provided, or actions may be eliminated, from the described flows, and other components may be added to, or removed from, the described systems.

Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

In some cases, various features described in connection with different embodiments may be combined in the same implementation. Further, as the foregoing implementations are intended as examples, various features may be omitted in some cases, and/or additional features may be present in some cases.

Thus, although particular examples of the subject matter have been described, other implementations are within the scope of the claims.

What is claimed is:

1. An apparatus, comprising:
a photodiode circuit, including at least one photodiode configured to receive optical mixing products based on a local oscillator signal and a plurality of optical subcarriers transmitted on an optical fiber from a remote transmitter, the photodiode circuit further configured to receive back-reflected light from the optical fiber, such that the photodiode circuit provides electrical signals based on the optical mixing products and the back-reflected light;
an analog-to-digital conversion circuit operable to provide digital outputs based on an analog inputs, the analog inputs being indicative of the electrical signals provided by the photodiode circuit;

a digital signal processor operable to receive the digital outputs and generate first internal signals indicative of data carried by the plurality of optical carriers and second internal signals indicative of the back-reflected light, the digital signal processor operable to cancel the second internal signals and provide output data based on the first internal signals, wherein each of the plurality of subcarriers has a corresponding one of a plurality of frequencies, each of the plurality of frequencies being different from a frequency associated with the back-reflected light.

2. An apparatus in accordance with claim 1, wherein the plurality of subcarriers is a first plurality of subcarriers, the apparatus further comprising an optical transmitter operable to supply a second plurality of subcarriers to the optical fiber.

3. An apparatus in accordance with claim 2, further including an optical hybrid circuit operable to receive the local oscillator signal and the plurality of optical subcarriers and outputs the mixing products.

4. An apparatus in accordance with claim 1, further including a local oscillator laser operable to supply the local oscillator signal.

5. An apparatus, comprising:
a photodiode circuit, including at least one photodiode configured to receive optical mixing products based on a local oscillator signal and a plurality of optical subcarriers transmitted on an optical fiber from a remote transmitter, the photodiode circuit further configured to receive back-reflected light from the optical fiber, such that the photodiode circuit provides electrical signals based on the optical mixing products and the back-reflected light;

an analog-to-digital conversion circuit operable to provide digital outputs based on an analog inputs, the analog inputs being indicative of the electrical signals provided by the photodiode circuit;

a digital signal processor operable to receive the digital outputs and generate first internal signals indicative of data carried by the plurality of optical carriers and second internal signals indicative of the back-reflected light, the digital signal processor operable to cancel the second internal signals and provide output data based on the first internal signals, the apparatus further including a plurality of multiplier circuits, wherein the apparatus is configured such that the second internal signals are cancelled out by multiplying the second internal signal by zero with the plurality of multiplier circuits.

6. An apparatus in accordance with claim 5, wherein the plurality of subcarriers is a first plurality of subcarriers, the apparatus further comprising an optical transmitter operable to supply a second plurality of subcarriers to the optical fiber.

7. An apparatus in accordance with claim 6, further including an optical hybrid circuit operable to receive the local oscillator signal and the plurality of optical subcarriers and outputs the mixing products.

8. An apparatus in accordance with claim 5, further including a local oscillator laser operable to supply the local oscillator signal.

9. An apparatus, comprising:
a photodiode circuit, including at least one photodiode configured to receive optical mixing products based on a local oscillator signal and a plurality of optical subcarriers transmitted on an optical fiber from a remote transmitter, the photodiode circuit further configured to receive back-reflected light from the optical fiber, such that the photodiode circuit provides electrical signals based on the optical mixing products and the back-reflected light;

an analog-to-digital conversion circuit operable to provide digital outputs based on an analog inputs, the analog inputs being indicative of the electrical signals provided by the photodiode circuit;

a digital signal processor operable to receive the digital outputs and generate first internal signals indicative of data carried by the plurality of optical carriers and second internal signals indicative of the back-reflected light, the digital signal processor operable to cancel the second internal signals and provide output data based on the first internal signals, wherein the digital signal processor further includes:
a fast Fourier transform circuit operable to provide frequency domain data based on the digital outputs of the analog-to-digital conversion circuits;
a plurality of switches; and
a plurality of memories, the plurality of switches operable to cancel the second internal signals by selectively supplying predetermined data to the plurality of memories instead of frequency domain data associated with the second internal signals.

10. An apparatus in accordance with claim 9, wherein the plurality of subcarriers is a first plurality of subcarriers, the apparatus further comprising an optical transmitter operable to supply a second plurality of subcarriers to the optical fiber.

11. An apparatus in accordance with claim 10, further including an optical hybrid circuit operable to receive the local oscillator signal and the plurality of optical subcarriers and outputs the mixing products.

12. An apparatus in accordance with claim 9, further including a local oscillator laser operable to supply the local oscillator signal.

* * * * *